United States Patent
Barrett et al.

(10) Patent No.: US 7,443,791 B2
(45) Date of Patent: Oct. 28, 2008

(54) PRIORITY MECHANISM FOR DISTRIBUTED SENDING OF MEDIA DATA

(75) Inventors: Peter T. Barrett, San Francisco, CA (US); James Armand Baldwin, Redwood City, CA (US); Dustin L. Green, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 10/800,287

(22) Filed: Mar. 12, 2004

(65) Prior Publication Data
US 2005/0081246 A1 Apr. 14, 2005

Related U.S. Application Data

(60) Provisional application No. 60/510,432, filed on Oct. 10, 2003.

(51) Int. Cl.
*G01R 31/08* (2006.01)
(52) U.S. Cl. .................... 370/230; 370/232; 370/444
(58) Field of Classification Search ............... 370/230, 370/232, 444
See application file for complete search history.

(56) References Cited

U.S. PATENT DOCUMENTS

| | | | |
|---|---|---|---|
| 5,461,415 A | 10/1995 | Wolf et al. | |
| 5,473,362 A | 12/1995 | Fitzgerald et al. | |
| 5,583,868 A | 12/1996 | Rashid et al. | |
| 5,631,694 A | 5/1997 | Aggarwal et al. | |
| 5,699,362 A | 12/1997 | Makam | |
| 6,047,317 A | 4/2000 | Bisdikian et al. | |
| 6,078,594 A | 6/2000 | Anderson et al. | |
| 6,112,101 A * | 8/2000 | Bhatia et al. ................ 455/512 |

(Continued)

FOREIGN PATENT DOCUMENTS

CA 2480461 10/2003

(Continued)

OTHER PUBLICATIONS

Ding, et al.; "Resource-Based Striping: An Efficient Striping Strategy for Video Servers Using Heterogeneous Disk-Subsystems"; Multimedia Tools and Applications, vol. 19, No. 1, Jan. 2003; pp. 29-51.

(Continued)

*Primary Examiner*—Firmin Backer
*Assistant Examiner*—Jason Mattis
(74) *Attorney, Agent, or Firm*—Lee & Hayes, PLLC

(57) ABSTRACT

Media data is distributed across multiple devices, and multiple schedulers and senders are installed across the multiple devices. Schedulers formulate send requests that stipulate particular media data portions and designate destination clients. Each send request is associated with a send priority. The send requests are transmitted from the multiple schedulers to the multiple senders. The senders rank respective received send requests according to their associated send priorities. Based on the ranked respective send requests and responsive to a respective send bandwidth of each sender, the senders ascertain respective threshold priorities. Each respective threshold priority corresponds to the lowest send priority of all send requests that have been accepted for sending by a respective sender. By comparing individual send priorities associated with individual send requests to respective threshold priorities, the schedulers are able to determine which send requests are selected for sending by respective senders.

30 Claims, 16 Drawing Sheets

U.S. PATENT DOCUMENTS

| | | | |
|---|---|---|---|
| 6,222,482 | B1 | 4/2001 | Gueziec |
| 6,430,547 | B1 | 8/2002 | Busche et al. |
| 6,438,630 | B1 * | 8/2002 | DeMoney ..................... 710/56 |
| 6,496,814 | B1 | 12/2002 | Busche |
| 6,505,106 | B1 | 1/2003 | Lawrence et al. |
| 6,609,149 | B1 | 8/2003 | Bandera et al. |
| 6,615,133 | B2 | 9/2003 | Boies et al. |
| 6,751,626 | B2 | 6/2004 | Brown et al. |
| 6,763,520 | B1 * | 7/2004 | Seeds .......................... 718/101 |
| 6,766,245 | B2 | 7/2004 | Padmanabhan |
| 6,842,724 | B1 | 1/2005 | Lou et al. |
| 7,039,784 | B1 | 5/2006 | Chen et al. |
| 7,085,843 | B2 | 8/2006 | Buddhikot et al. |
| 7,155,533 | B2 * | 12/2006 | Klotsche ..................... 709/235 |
| 2002/0107968 | A1 | 8/2002 | Horn et al. |
| 2002/0108119 | A1 | 8/2002 | Mao et al. |
| 2002/0152318 | A1 | 10/2002 | Menon et al. |
| 2003/0159143 | A1 | 8/2003 | Chan |
| 2003/0202775 | A1 | 10/2003 | Junkersfeld et al. |
| 2004/0128694 | A1 | 7/2004 | Bantz et al. |
| 2004/0160974 | A1 | 8/2004 | Read et al. |
| 2005/0047340 | A1 * | 3/2005 | Babiarz et al. .............. 370/231 |
| 2005/0078757 | A1 | 4/2005 | Nohrden |
| 2005/0154917 | A1 | 7/2005 | deCarmo |
| 2005/0172314 | A1 | 8/2005 | Krakora et al. |
| 2007/0124781 | A1 | 5/2007 | Casey et al. |

FOREIGN PATENT DOCUMENTS

| | | |
|---|---|---|
| EP | 0633694 A | 1/1995 |
| WO | WO 99/09741 | 2/1999 |
| WO | WO 01/26271 | 4/2001 |
| WO | WO 01/56285 | 8/2001 |
| WO | WO03088646 | 10/2003 |
| WO | WO2004062291 | 7/2004 |

OTHER PUBLICATIONS

Song, et al; "Replica Striping for Multi-resolution Video Servers"; IDMS/PROMS 2002; Lecture Notes in Computer Science, vol. 2515; No. 2002; pp. 300-312.

Lo, et al; "Deploy Multimedia-on-Demand Services over ADSL Networks"; PCM 2002; Lecture Notes in Computer Science, vol. 2532; Dec. 2002; pp. 295-302.

Lee; "Staggered Push-A linearly Scalable Architecutre for Push-Based Parallel Video Servers"; IEEE Transactions on Multimedia, vol. 4; No. 4; Dec. 2002; pp. 423-434.

Gonzalez, et al; "Load Sharing Based On Popularity In Distributed Video On Demand Systems"; Proceedings 2002 IEEE Int'l. Conf. on Multimedia and Expo, vol. 1; Aug. 2002; pp. 5-8.

U.S. Appl. No. 10/798,993; Barrett, et al.; filed Mar. 12, 2004.

U.S. Appl. No. 10/800,287; Barrett, et al.; filed Mar. 12, 2004.

U.S. Appl. No. 10/800,309; Barrett, et al.; filed Mar. 12, 2004.

"Digital Headend Solutions; Tune in to Digital TV", retrieved from the Internet on Nov. 3, 2005, Available at <<http://www.tutsystems.com/digitalheadend/solutions/index.cfm>>, 1 page.

"Infovalue Experts; Info Value Unveils Industry's First Video Multicasting Solution with Instant Replay", retrieved from the Internet on Nov. 3, 2005, Available at <<http://www.infovalue.com/links/news%20room/press%20releases/1999/Press_%20First_Multicasting_with_Instant_Replay.pdf>>, 3 pages.

MediaFLO; Introducing FLO Technology:, retrieved from the Internet on Nov. 3, 2005, available at <<http://www.qualcomm.com/mediaflo/news/pdf/flo_whitepaper.pdf>>, pp. 1-8.

"Optibase MGW 2400", retrieved from the Internet Nov. 3, 2005, Available at <<http://www.epecomgraphics.com/optibase_mgw2400_features.html>>, 2 pages.

"QuickTime Streaming your Media in Real Time", retrieved from the Internet on Nov. 3, 2005, Accessible at <<http://www.apple.com.tw/quicktime/technologies/streaming/>>, 3 pages.

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "Person Identification Using Automatic Height and Stride Estimation," IEEE International Conference on Pattern Recognition, Aug. 22, 2002-Aug. 15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition," Workshop on Biometric Authentication (BIOMET), in association with ECCV 2002, Jun. 1, 2002, 12 pages.

BenAbdelkader, et al., "EigenGait: Motion-based Recognition of People Using Image Self-similarity," Proc. Intl. on Audio and Video-based Person Authentication (AVBPA), 2001, 11 pages.

BenAbdelkader, et al., "Motion-based Recognition of People in Eigengait Space," 5th International Conference on Automatic Face and Gesture Recognition, May 20, 2002, pp. 1-6.

Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.

Tsai, R., "An Efficient and Accurate Camera Calibration Technique for 3d Machine Vision," Proceedings of the Computer Vision and Pattern Recognition, 1986, pp. 364-374.

Turk, et al., "Face Recognition Using Eigenfaces," CVPR, 1991. pp. 586-591.

Haritaoglu, et al., "W4S: A Real-Time System for Detecting and Tracking People in 2 ½D," in European Conference on Computer Vision, 1998, 16 pages.

U.S. Appl. No. 10/218,675; Barrett, et al.; filed Aug. 13, 2002.

U.S. Appl. No. 10/218,674; Barrett, et al.; filed Aug. 13, 2002.

U.S. Appl. No. 10/010,200; Smith, et al.; filed Dec. 10, 2004.

Gil, et al., "Simulation of a Mobility Prediction Scheme Based on Neuro-Fuzzy Theory in Mobile Computing",Simulation, Jul. 2000, vol. 75, No. 1, pp. 6-17.

"Multidimensional Database Technology", Computer, Dec. 2001, vol. 34, No. 12, pp. 40-46.

Wolfson, et al., "Modeling Moving Objects for Location Based Services", Lecture Notes in Computer Science, 2002, vol. 2538, pp. 46-58.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Cost Model of Moving Objects Communication with GPS", International Conference on Communications, Circuits and Systems and West Sino Exposition Proceedings, 2002, vol. 2, pp. 1576-1580.

\* cited by examiner

PRIORITY MECHANISM FOR DISTRIBUTED SENDING OF MEDIA DATA

CROSS-REFERENCE TO RELATED APPLICATION

This U.S. Nonprovisional Application for Letters Patent claims the benefit of U.S. Provisional Application No. 60/510,432, filed Oct. 10, 2003 (entitled "Distributed Sending of Media Data").

TECHNICAL FIELD

This disclosure relates in general to the distributed sending of media data and in particular, by way of example but not limitation, to a priority mechanism for the distributed sending of media data.

BACKGROUND

Television-based entertainment systems traditionally rely on cable networks in which the same television programming is broadcast to every client. In other words, the same television channels and pay-per-view movies are broadcast at the same time to every client that is connected to the cable network.

This broadcasting approach with cable networks entails two drawbacks. First, because all programming content is broadcast at a single time, a viewer has no control regarding the time at which a program is viewed. Second, with all programs broadcast to every client, bandwidth limitations render impracticable true video-on-demand (VOD) for just movies alone, much less for television programming in general.

FIG. 1 illustrates an existing approach 101 to television programming dissemination. Television programming dissemination approach 101 is an existing attempt to counter the above-noted drawbacks. Multiple television programming sources 103(1), 103(2) . . . 103(j) store and provide television programming. A central collector and forwarder 105 determines when television programming needs to be sent to clients (not shown) through a network switch 107 via a network (also not shown).

Each request 109(1, 2 . . . j) for television programming is sent from central collector and forwarder 105 to a respective television programming source 103(1, 2 . . . j). In response, each respective television programming source 103(1, 2 . . . j) provides requested television programming portions as collecting communications 111(1, 2 . . . j) to central collector and forwarder 105. Central collector and forwarder 105 thereafter forwards the television programming portions as forwarding communications 113(1, 2 . . . j) to network switch 107 and thence to the clients via some network.

Each requested television programming portion is therefore routed through central collector and forwarder 105, which can become a bottleneck, prior to being sent to clients by way of network switch 107. Moreover, television programming dissemination approach 101 as illustrated in FIG. 1 is somewhat simplified. Although not so explicitly illustrated, requested television programming portions as collecting communications 111(1, 2 . . . j) are actually provided to central collector and forwarder 105 from television programming sources 103(1, 2 . . . j) by way of network switch 107.

Consequently, television programming portions that are destined for various clients traverse network switch 107 twice. Television programming portions are sent through switch 107 first to central collector and forwarder 105 as collecting communications 111(1, 2 . . . j) and then second from central collector and forwarder 105 as forwarding communications 113(1, 2 . . . j). The (i) central collection and funneling and (ii) double switch traversal present additional limiting factors. Hence, bandwidth and bottleneck issues continue to be present with television programming dissemination approach 101.

SUMMARY

Media data is distributed across multiple devices, and multiple schedulers and senders are installed across the multiple devices. Multiple respective senders are associated with multiple respective distributed portions of the media data. Multiple schedulers are associated with clients and are capable of scheduling the sending of media data thereto. Schedulers formulate send requests that stipulate particular media data portions and designate destination clients. Each send request is associated with a send priority. The send requests are transmitted from the multiple schedulers to the multiple senders. The senders rank respective received send requests according to their associated send priorities. Based on the ranked respective send requests and responsive to a respective send bandwidth of each sender, the senders ascertain respective threshold priorities. Each respective threshold priority corresponds to the lowest send priority of all send requests that have been accepted for sending by a respective sender. The threshold priorities are transmitted from the multiple senders to the multiple schedulers. By comparing individual send priorities associated with individual send requests to respective threshold priorities, the schedulers are able to determine which send requests are selected for sending by respective senders.

Other method, system, approach, apparatus, server, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
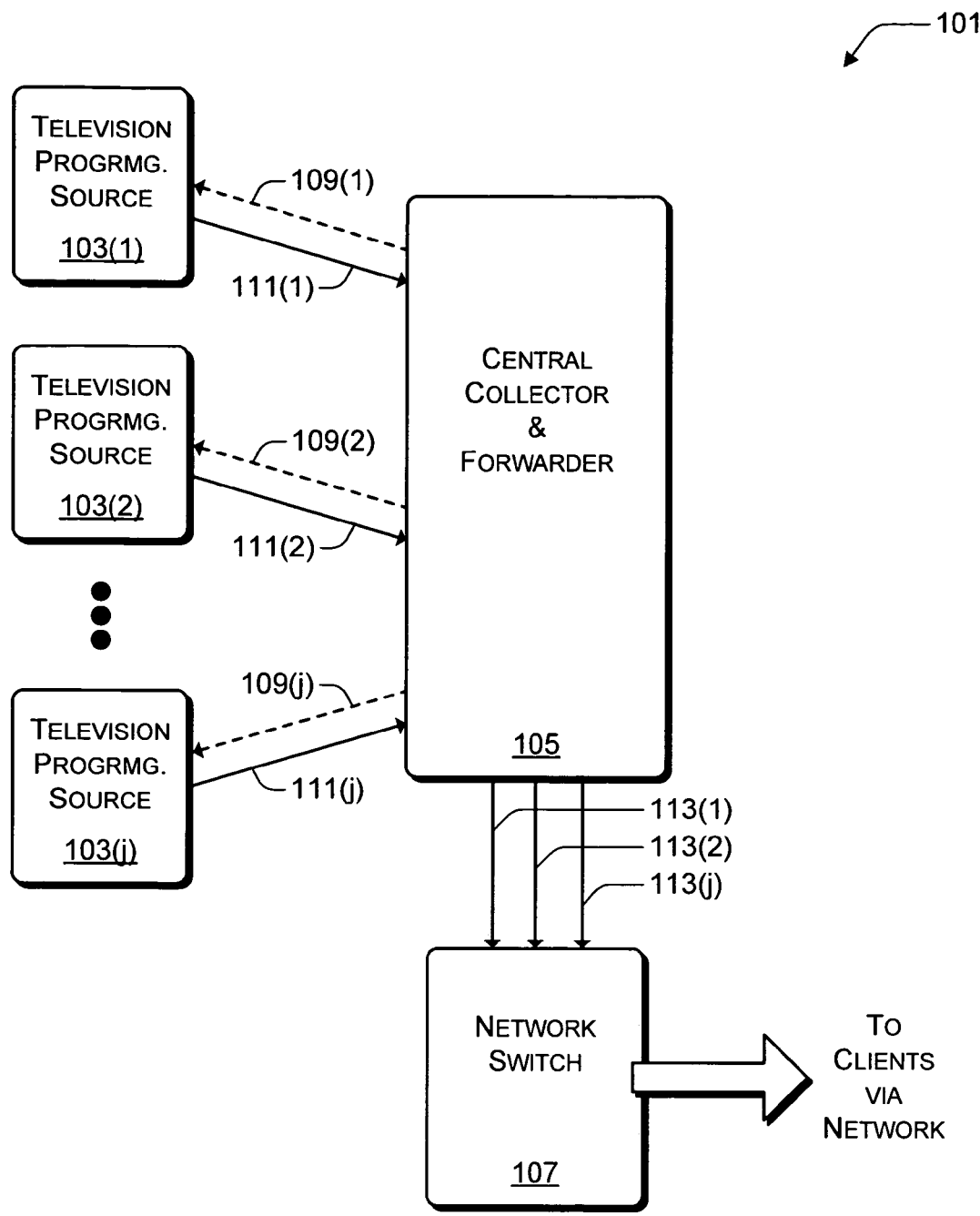
FIG. 1 illustrates an existing approach to television programming dissemination.
Figure 2:
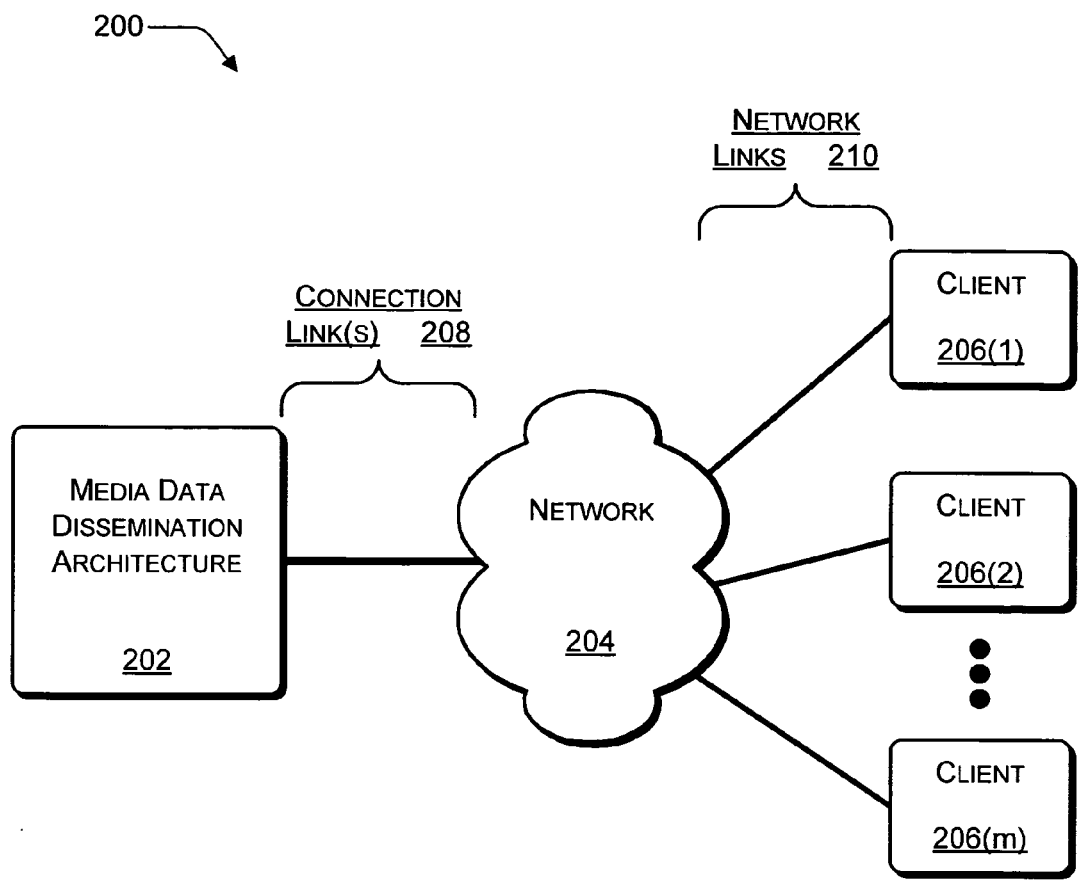
FIG. 2 is an exemplary environment for media data dissemination architecture.

FIG. 2 is an exemplary environment 200 for media data dissemination architecture 202. Environment 200 includes, in addition to media data dissemination architecture 202, a network 204 and multiple clients 206(1), 206(2) . . . 206(m). Clients 206 are capable of receiving and processing media data (not separately shown in FIG. 2). Clients 206 may optionally be capable of displaying and/or causing to be displayed the media data. Such media data usually includes both audio and visual information, as well as optionally control information to facilitate the processing and/or display thereof. Although only three clients 206(1, 2, m) are explicitly depicted in FIG. 2, clients 206 may actually number in the tens to hundreds of thousands (e.g., "m" can equal 10,000 to 100,000 or more).

As illustrated, media data dissemination architecture 202 is coupled to network 204 by one or more connection links 208. Clients 206 are coupled to network 204 by one or more network links 210. Consequently, media data dissemination architecture 202 is in communication with and coupled to clients 206 via network 204. Network 204 is capable of supporting unicast communications and optionally multicast communications in certain implementations described further herein below.

In operation of a described implementation, a particular client 206 requests that a desired media data asset be sent to it. Media data dissemination architecture 202 receives the request and sends the requested media data asset to the particular client 206 using repeated unicast communications over connection links 208, network 204, and network links 210. The architecture of media data dissemination architecture 202 is adapted to effectuate a distributed sending of media data to clients 206 so as to reduce communication traffic bandwidth and/or bottlenecks that are otherwise internal to media data dissemination architecture 202.

Architecture for Distributed Sending of Media Data

Figure 3:
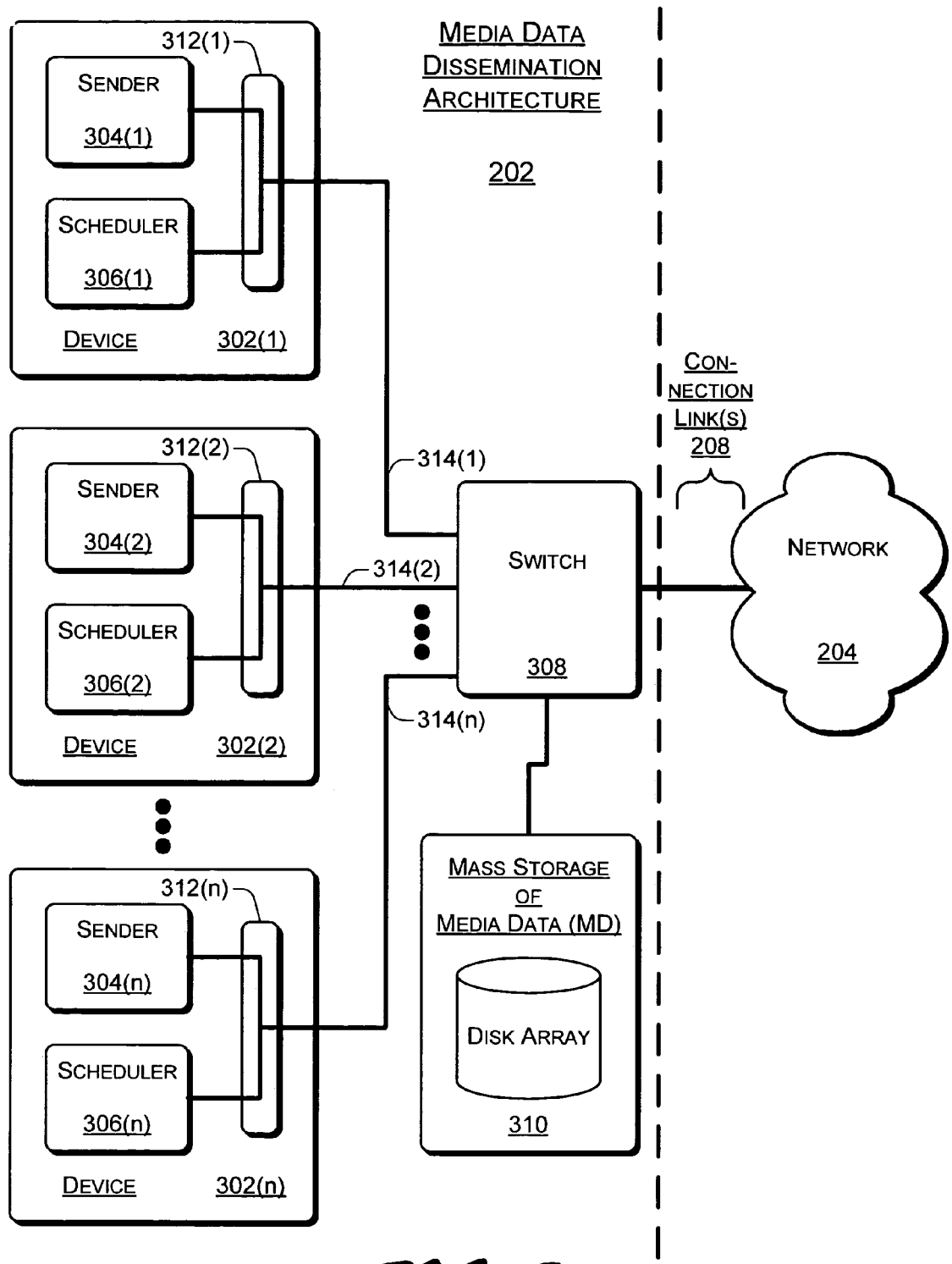
FIG. 3 illustrates exemplary media data dissemination architecture that includes devices for distributed sending of media data.

FIG. 3 illustrates exemplary media data dissemination architecture 202 that includes devices 302 for distributed sending of media data. Media data dissemination architecture 202 includes multiple devices 302(1), 302(2) . . . 302(n). Each respective device 302(1, 2 . . . n) includes a respective sender 304(1, 2 . . . n) and a respective scheduler 306(1, 2 . . . n). Media data dissemination architecture 202 also includes a switch 308 and a mass storage of media data (MD) 310.

As illustrated, media data dissemination architecture 202 is coupled to network 204 by connection links 208 at switch 308. Switch 308 is coupled to each respective device 302 (1, 2 . . . n) by respective links 314(1, 2 . . . n) that are internal to media data dissemination architecture 202. Switch 308 is also coupled to mass storage of media data 310.

Mass storage of media data 310 stores a sizable quantity of media data in some type of mass storage device such as a disk array. The disk array may be, for example, a redundant array of independent disks (RAID), a fibre channel storage system, and so forth. By way of example only, mass storage of media data 310 may have a storage capacity of 5-6 terabytes (TBs). Nevertheless, a significant percentage of the total quantity of media data is cached at devices 302 so that mass storage of media data 310 is primarily accessed to provide media data for unexpected and/or rare media data asset requests and to rebuild failed devices 302.

In a described implementation, media data is cached in random access memory (RAM) (not specifically shown in FIG. 3) of devices 302(1, 2 . . . n). By way of example only, if there are 500 devices 302 (e.g., if n=500) and each machine includes 4 gigabytes (GBs) of RAM, approximately 2 TBs of RAM is available for RAM caching of the media data. Each device 302(1, 2 . . . n) caches a proportion of the total percentage of media data that is cached by devices 302.

A hashing approach is used to allocate different media data blocks to different devices 302. This hashing approach and associated media data organization are described further below in the section entitled "Media Organization for Distributed Sending of Media Data". This media data organization addresses the differences and relationships between and among media data segments, media data assets, media data blocks, and media data sub-blocks.

Each respective sender 304 is associated with the media data that is cached by its respective device 302. Each sender 304 is responsible for storing the media data that is allocated thereto and for sending the media data in a distributed fashion to clients 206 responsive to requests from any scheduler 306 of schedulers 306(1, 2 . . . n).

Each scheduler 306 is associated with multiple clients 206. For each given client 206 with which a particular scheduler 306 is associated, that particular scheduler 306 is responsible for meeting the media data dissemination requests of the given client 206. To that end, the particular scheduler 306 may have knowledge of potential choke points within network 204 and along network links 210 that can affect the ability to disseminate media data to the given client 206 in a timely manner. Hence, the particular scheduler 306 is capable of considering these choke points when scheduling the sending of media data from senders 304 to its associated clients 206. A choke-point related U.S. patent application entitled "Media Stream Scheduling for Hiccup-Free Fast-Channel-Change in the Presence of Network Chokepoints" with an inventorship of Dustin L. Green was filed on Oct. 10, 2003, and assigned U.S. patent application Ser. No. 10/683,132. This U.S. patent application Ser. No. 10/683,132, which has a common assignee of Microsoft Corporation with that of the instant Patent Application, is hereby incorporated by reference in its entirety herein.

Because the media data is striped across devices 302, a requesting scheduler 306 makes media data sending requests to multiple senders 304. When it is time to schedule delivery of a portion of a media data block that is associated with a particular sender 304, a requesting scheduler 306 transmits a send request to that particular sender 304 using links 314 and switch 308. The send request designates a destination client 206 and stipulates/schedules a desired portion of a media data block (including a sub-block(s), sub-block range, or portion(s) thereof).

The particular sender 304 then forwards the stipulated media data sub-block to the designated client 206 using a link 314 and switch 308 without routing the media data sub-block through the requesting scheduler 306 and without sending the media data sub-block through switch 308 twice. An exemplary set of messages for requesting and sending media data blocks is described further below, including with reference to FIG. 5 in this section.

As illustrated, a sender 304 and a scheduler 306 are included at each device 302. However, because senders 304 and schedulers 306 are logically separate, they may also be physically separate as well. For example, a number of devices 302 or each device 302 may alternatively include a sender 304 or a scheduler 306 (but not both). Nevertheless, a described implementation includes a sender 304 and a scheduler 306 on each device 302 so as to use relatively efficiently the processing, memory, and link bandwidth resources of each device 302.

Also illustrated for each respective sender 304(1, 2 ... n) and scheduler 306(1, 2 ... n) is a respective interface 312 (1, 2 ... n) that is shared by both. Alternatively, each may have its own interface 312 and link 314 to switch 308. By way of example only, switch 308 may be realized using a Gb Ethernet switch with hundreds of ports. Each such port corresponds to a link 314 and provides a two-way communication bandwidth of 1 Gb/s per direction that is shared by senders 304 and schedulers 306 for both protocol and media data-related communications.

Alternatively, schedulers 306 (and therefore senders 304) may employ a separate internal communication network with a separate switch (e.g., a 100 Mb Ethernet switch) or router that provides a separate communication avenue for protocol messages that are being sent between and among schedulers 306 and senders 304. Exemplary separate linkages 314 are illustrated in FIG. 4 for schedulers 306 and senders 304 and may correspond to separate interfaces 312 and/or to separate communication networks that are internal to media data dissemination architecture 202.

Figure 4:
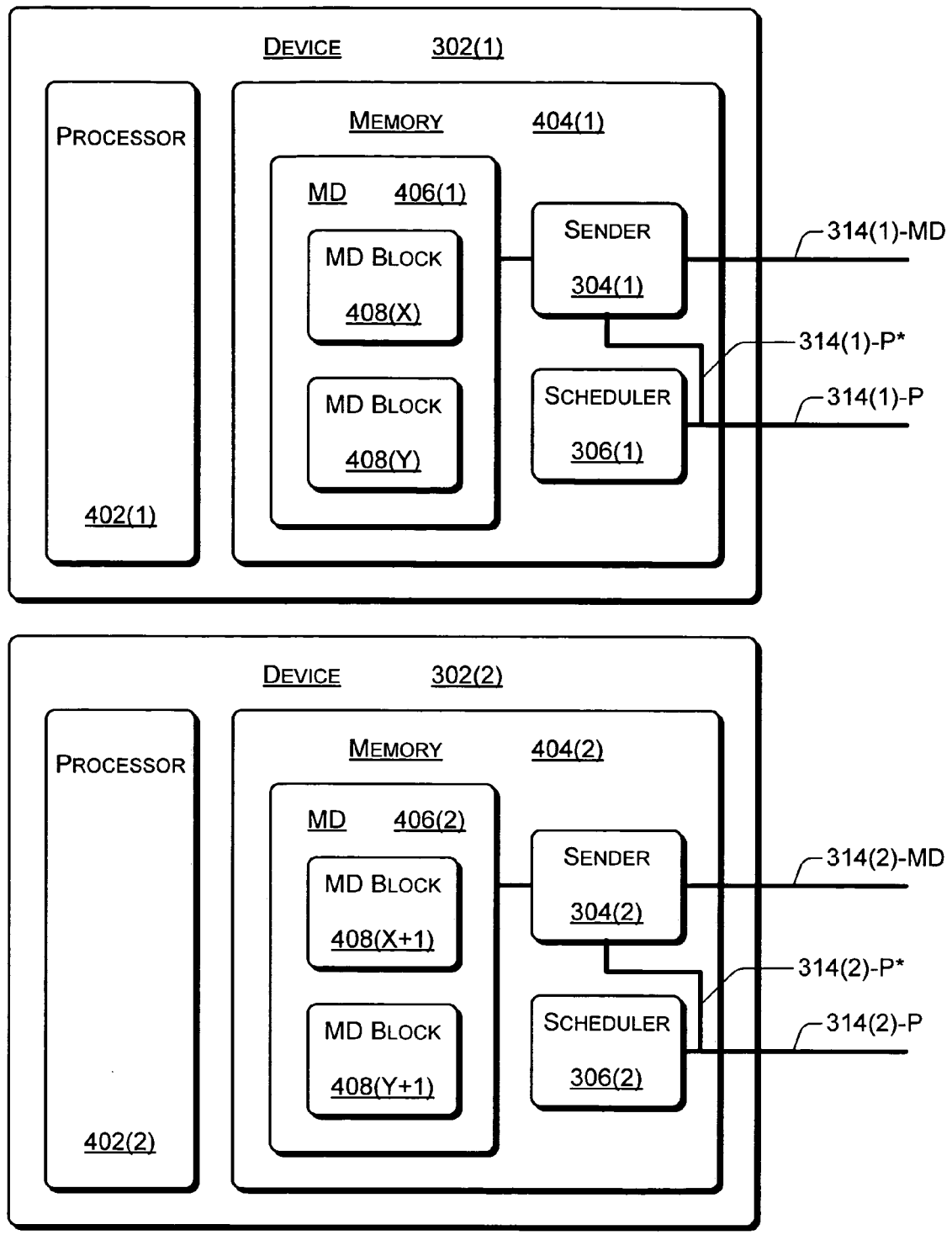
FIG. 4 illustrates exemplary devices for distributed sending of media data that is striped across the devices.

FIG. 4 illustrates exemplary devices 302 for distributed sending of media data 406 that is striped across devices 302. Device 302(1) includes one or more processors 402(1) and at least one memory 404(1). Although not separately indicated as such, memory 404(1) includes processor-executable instructions that may be executed by processor 402(1) to perform function(s) as described generally further below. Memory 404(1) may be realized as a combination of memories of differing types, features, and functions. Generally, however, memory 404 is a relatively low-latency memory with relatively greater throughput as compared to mass storage of media data 310, which is a relatively high-latency memory with relatively less throughput.

In a described implementation, these processor-executable instructions may comprise hardware, firmware, software, some combination thereof, and so forth. Modules having processor-executable instructions that are stored as parts of memory 404(1) include: sender 304(1), scheduler 306(1), and media data (MD) 406(1). Media data 406(1) comprises a data structure type module of processor-executable instructions. In a described implementation, media data 406(1) is stored in RAM. Each of these modules is described further herein below.

Sender 304(1) is coupled to switch 308 using link 314(1)-MD for media data communication, and scheduler 306(1) is coupled to switch 308 using link 314(1)-P for protocol communication. Scheduler 306(1) thus transmits and receives protocol-related messages via link 314(1)-P. Sender 304(1) sends media data 406(1) from device 302(1) via link 314(1)-MD. Links 314(1)-P, as represented by optional links 314(1)-P*, may be realized as a separate network with a separate switch that is dedicated to protocol communications between senders 304 and schedulers 306. If no other separate link 314(1) exists (e.g., link 314(1)-P*) for sender 304(1), sender 304(1) may also transmit and receive protocol-related messages via link 314(1)-MD.

Media data 406(1) includes a media data block for media data 408× and a media data block for media data 408Y. Specifically, media data 406(1) includes media data block 408(X) and media data block 408(Y). Sender 304(1) is therefore adapted to store media data blocks 408(X) and 408(Y) and is capable of sending them to clients 206 responsive to requests that are received from schedulers 306.

Device 302(2) includes analogous components to those of device 302(1). These components include one or more processors 402(2) and at least one memory 404(2), which includes sender 304(2), scheduler 306(2), and media data 406(2). However, media data 406(2) includes different media data blocks for media data 408X and 408Y as compared to those media data blocks (i.e., media data blocks 408(X) and 408(Y)) that are stored as part of media data 406(1) at device 302(1).

As illustrated, sender 304(2) stores as part of media data 406(2) media data block 408(X+1) and media data block 408(Y+1). Media data block 408(X+1) follows media data block 408(X) along a stream of media data 408×. Media data block 408(Y+1) follows media data block 408(Y) along a stream of media data 408Y. Thus, media data is striped (but not necessarily linearly) across RAM as media data 408X and media data 408Y are striped across RAM portions of memories 404(1) and 404(2) of devices 302(1) and 302(2), respectively. In a described implementation, media data is striped at a media data block granularity. Distributed sending of media data 408X is described further below with reference to FIG. 5.

The illustration of FIG. 4 is not intended to convey any necessarily sequential correspondence between sequential media data blocks and devices 302. In other words, devices 302(1) and 302(2) storing media data blocks X/Y and X+1/Y+1, respectively, is an example only. Sequential media data blocks are not necessarily sequentially striped, and they are in fact unlikely to be sequential using a "hash striping" approach as described herein below with particular reference to FIG. 11 in the section entitled "Media Organization for Distributed Sending of Media Data".

Figure 5:
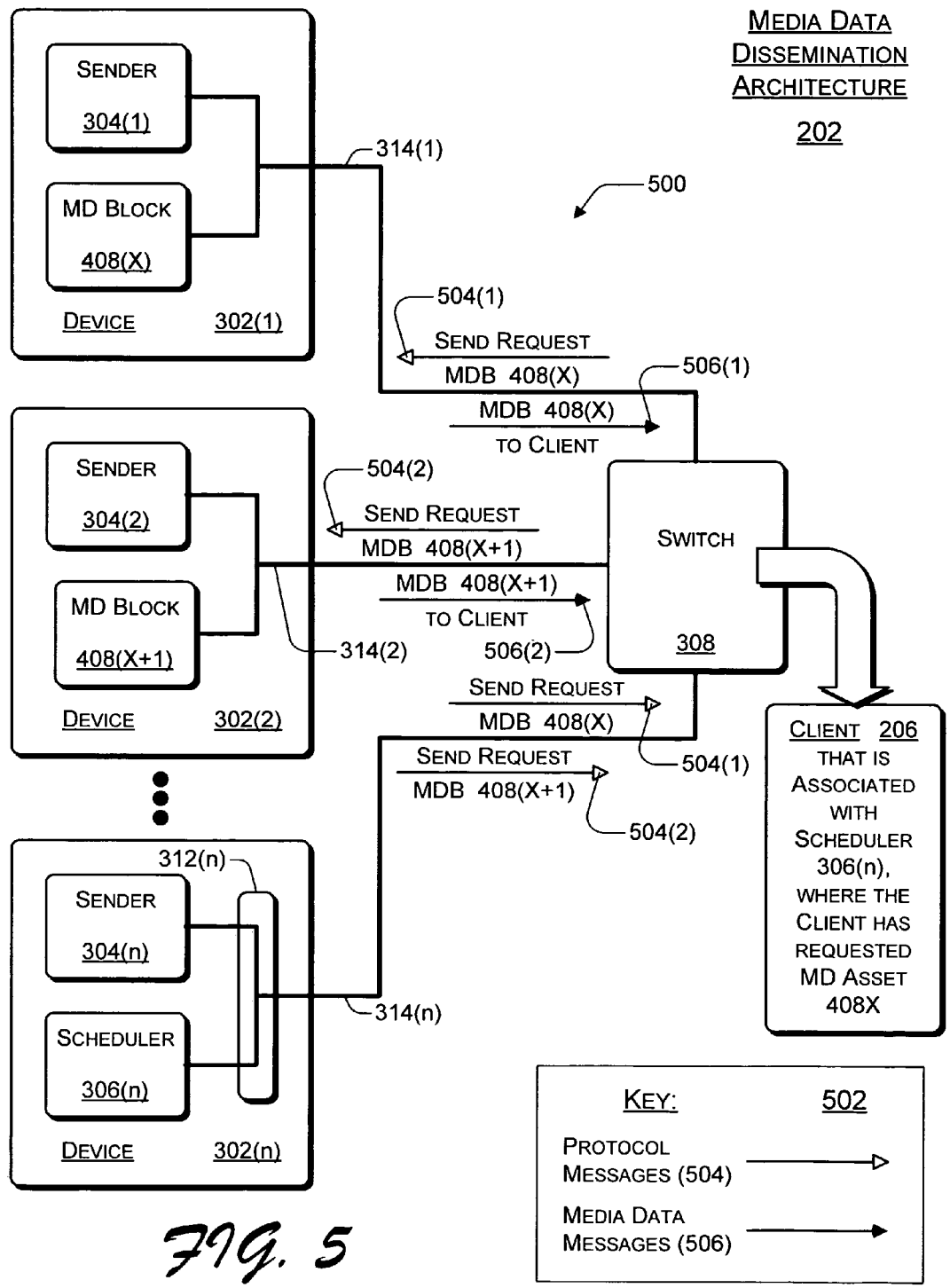
FIG. 5 illustrates an exemplary approach to distributed media data dissemination that includes messages used by multiple devices.

FIG. 5 illustrates an exemplary approach 500 to distributed media data dissemination that includes messages 504 and 506 used by multiple devices 302. The distributed sending of media data asset 408X is performed on behalf of a client 206 that is associated with scheduler 306(n) and that has requested delivery of media data asset 408X. A key 502 indicates that open-tipped arrows represent protocol messages 504 and that solid-tipped arrows represent media data messages 506.

In a described implementation, scheduler 306(n) transmits a send request protocol message 504(1) to sender 304(1) via switch 308. Send request protocol message 504(1) stipulates media data block 408(X) and designates the client 206 (e.g., using an identifying network address) to which the stipulated media data block 408(X) is to be sent. In response, sender 304(1) sends media data message 506(1) to or toward the designated client 206 via switch 308 without directing it through sender 304(n) or device 302(n). Media data (content) message 506(1) includes the stipulated media data block 408(X).

Similarly, scheduler 306(n) transmits a send request protocol message 504(2) to sender 304(2) via switch 308. Send request protocol message 504(2) stipulates media data block 408(X+1) and designates the client 206 to which the stipulated media data block 408(X+1) is to be sent. In response, sender 304(2) sends media data message 506(2) to or toward the designated client 206 via switch 308 without directing it through sender 304(n) or device 302(n). Media data (content) message 506(2) includes the stipulated media data block 408 (X+1).

Messages 504 and 506 of FIG. 5 omit some detail for the sake of clarity. For example, as noted above, messages 504 and 506 may actually be directed to a portion or sub-block of an entire media data block 408(X) or 408(X+1). Moreover, each individual message 504 may request the sending of multiple such portions or sub-blocks of an entire media data block. Media data sub-blocks are described further below with particular reference to FIG. 10.

Employing distributed media data dissemination approach 500 ameliorates potential problems with bottlenecks. Unfortunately, bottlenecks can still occur, especially with media data blocks that are currently very popular. By distributing (e.g., using a hash striping) the media data at the media data block level across multiple devices 302, distributed sending can be employed which concomitantly distributes workload and bandwidth constraints across many devices 302 and links 314, respectively. Unfortunately, this distribution can be jeopardized for very popular media data blocks.

For example, live media data presentations can result in a significant portion of clients 206 requesting not only the same media data asset simultaneously but the actual same media data block simultaneously as well. Because the entire media data block is on a single device 302 with limited sending bandwidth, it can be difficult to service all interested clients 206 simultaneously. Consequently, for popular media data blocks generally and for live media data presentations specifically, multicasting and/or block replication is utilized in a described implementation.

Multicasting can alleviate bottlenecks from simultaneous requests for a single media data block by enabling a device 302 to send one copy (or a reduced number of copies) of each sub-block of a media data block. The media data sub-block is sent to a single replication point (or a lowered number of replication points compared to the total number of interested clients 206) that is downstream from switch 308 and within a multicast-capable implementation of network 204.

An intention to utilize multicasting may be determined ahead of time manually, especially for live media data presentations such as known sporting events. Media data dissemination architecture 202 may also or alternatively be capable of monitoring an instantaneous popularity of media data blocks (or entire assets) and migrating from a unicast-media-data-sending to a multicast-media-data-sending when the instantaneous popularity reaches a predetermined level (e.g., 40%, 60%, etc.) for a single media data block.

Generally, media data block replication can alleviate bottlenecks arising from simultaneous requests for a single media data block by enabling multiple devices 302 to send the replicated block. For live media data presentations, the multiple devices 302 may acquire the replicated blocks via multicasting. The multiple devices 302 that have a copy of the replicated media data block may be all or only a sub-set of the total devices 302(1 . . . n). Media data block replication is described further below with particular reference to FIGS. 11-13.

Although bottlenecks are usually not an issue for non-live media data presentations, bandwidth constraints that are internal to media data dissemination architecture 202 are still addressed to facilitate the relatively reliable and efficient distributed sending of media data presentations generally. For example, each link 314 has a maximum outgoing bandwidth, and each respective sender 304 is receiving multiple send request protocol messages 504 from different schedulers 306.

Consequently, no single scheduler 306 is aware of how much bandwidth a given sender 304 has available. This per-sender 304/per-link 314 bandwidth issue is addressed below in the section entitled "Priority Mechanism for Distributed Sending of Media Data".

Priority Mechanism for Distributed Sending of Media Data

In a described implementation, a priority mechanism enables relatively efficient and full utilization of available media data sending bandwidth from senders 304.

Figure 6:
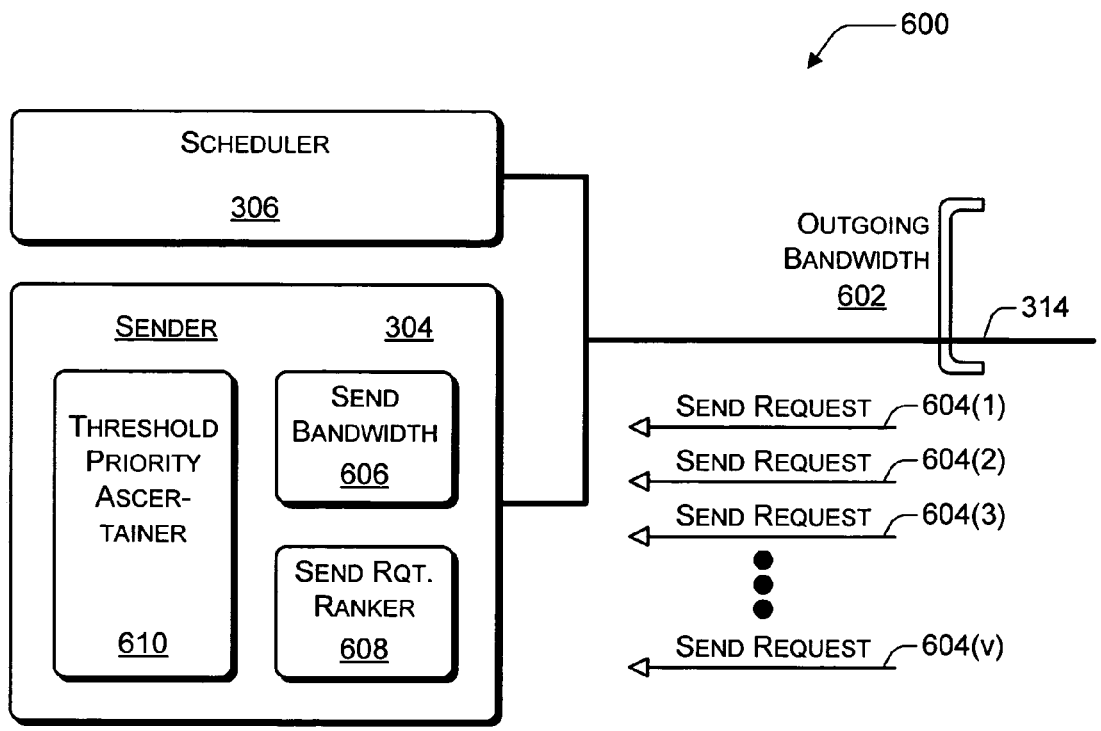
FIG. 6 illustrates a first aspect of an exemplary approach to a priority mechanism for distributed sending of media data.

FIG. 6 illustrates a first aspect 600 of an exemplary approach to a priority mechanism for distributed sending of media data. A scheduler 306 and a sender 304 are shown coupled to a link 314. Link 314 has a finite outgoing bandwidth 602. Sender 304 receives multiple send requests 604 (1), 604(2), 604(3) . . . 604(v).

Each send request 604 can correspond to a send request protocol message 504 that stipulates a media data block (including a portion thereof) and designates a client 206 to which at least a portion of the media data block is to be sent. Each send request 604 originates at and is transmitted from a scheduler 306 of multiple schedulers 306 (that are not shown in FIG. 6).

In a described implementation, sender 304 includes a send bandwidth 606, a send request ranker 608, and a threshold priority ascertainer 610. Send bandwidth 606 is the amount (e.g., the percentage) of outgoing bandwidth 602 that is partitioned for use by sender 304 when sending media data to clients 206. Typically, send bandwidth 606 is less than outgoing bandwidth 602 in order to reserve some of outgoing bandwidth 602 for protocol messages 504 and to over-provision the system to reduce the likelihood of a streaming failure. For example, send bandwidth 606 may be 95% of outgoing bandwidth 602.

Send request ranker 608 is adapted to rank send requests 604 in order of priority. Each send request 604 is associated with a unique global priority. The unique global priority is calculated from one or more of a variety of factors. First, priority is dependent on whether the requested media data sub-block is deadline data or early data. Deadline data is media data that must be sent during a current timeslot or a streaming failure is extremely likely to occur. Early data is data that is being sent prior to what would otherwise be a deadline timeslot. Deadline data has a higher priority than early data.

Priority is also dependent on whether two (or more) devices 302 store the requested media data sub-block. For example, for highly popular media data blocks, the media data is replicated onto a second device 302. Media data that is replicated has a lower initial priority than media data that is on a single device 302 or, more generally, that is associated with only a single sender 304. However, if neither device 302 of two devices 302 would send the replicated media data if two possible devices were factored into or considered in the prioritization, one particular device 302 is picked and that particular device 302 is informed that there is only one capable device.

The part of the priority determination process that reflects the number of devices 302 (or senders 304) that are capable of sending the data is termed the "option count". The option count equals the number of devices 302 that store a copy of a given media data block. Generally, media data sends that can originate from relatively fewer devices (corresponding to a relatively lower option count) are higher priority than media data sends that can originate from relatively more devices (corresponding to a relatively higher option count). Replication and popularity are described further below in the section entitled "Media Organization for Distributed Sending of Media Data".

The priority determination process also involves consideration of how early a data request is when it is not a deadline data request. For example, relatively sooner early data is assigned a higher priority than relatively later early data. By way of explanation, sooner early data is used by a client before later early data. Thus, although both are after a deadline, sooner early data is closer in time to the deadline than later early data. Deadline data and early data are discussed further below in the section entitled "Scheduling Scheme for Distributed Sending of Media Data".

Priority is also dependent, at least in cases that would otherwise result in ties, on network addresses and/or other unique ID values. For example, the address of device 302, the address of the scheduler 306, the address of the sender 304 (e.g., if separate from device 302 and/or scheduler 306), the address of the destination client 206, some combination thereof, etc. may be factored into the priority calculation. For instance, a media data send on behalf of a device 302 (or a scheduler 306 thereof) with a lower internet protocol (IP) address may be assigned a higher priority than a media data send on behalf of a device 302 with a higher IP address.

Other prioritization factors may also be considered when calculating the unique priority of a send request 604. In short, an exemplary list of prioritization factors is:
  Deadline data versus early data, with deadline data having a higher priority;
  Fewer capable senders versus many capable senders, with fewer capable senders having a higher priority;
  Sooner early data versus later early data (which may be established as a continuum), with sooner early data having a higher priority;
  Scheduler ID (which can be formed from, e.g., the IP address plus a port number or some other ID that is unique to each individual scheduler 306);
  Uniqueifying request ID (which is assigned by a scheduler 306 to keep all of its own requests unique from one other—and therefore guaranteed unique from other scheduler's requests because of the different scheduler IDs); and
  so forth.

In a described implementation, each scheduler 306 calculates the associated unique priority of each send request 604 that it is transmitting, and this associated unique priority is included in each send request 604. The transmitting scheduler 306 is aware of whether the requested media data is deadline data, early data, how soon the early data is, and so forth. However, senders 304 may alternatively perform the priority calculation, especially if any relevant factors that they do not otherwise have are provided to senders 304.

Send request ranker 608 therefore uses respective associated unique priorities of respective send requests 604 to rank the associated send requests 604. Send requests 604 are ranked from most important to least important. As used herein, highest priority equates to most important, greater priority equates to more important, and lower priority equates to less important.

Threshold priority ascertainer 610 is configured to ascertain a threshold priority for sender 304 based on the ranked send requests 604 and responsive to send bandwidth 606. Specifically, bandwidth that is consumed by send requests 604 is accumulated first from those send requests 604 that are more important and then second from those send requests 604 that are less important. When the accumulated bandwidth meets or exceeds send bandwidth 606, a send request cutoff with respect to send requests 604 is detected. The associated unique priority of the "last" (i.e., least important) send request 604 to be within send bandwidth 606 and thus to make the send request cutoff is ascertained to be the threshold priority. The send request cutoff and determination of the threshold priority are described below with particular reference to FIG. 7.

Figure 7:
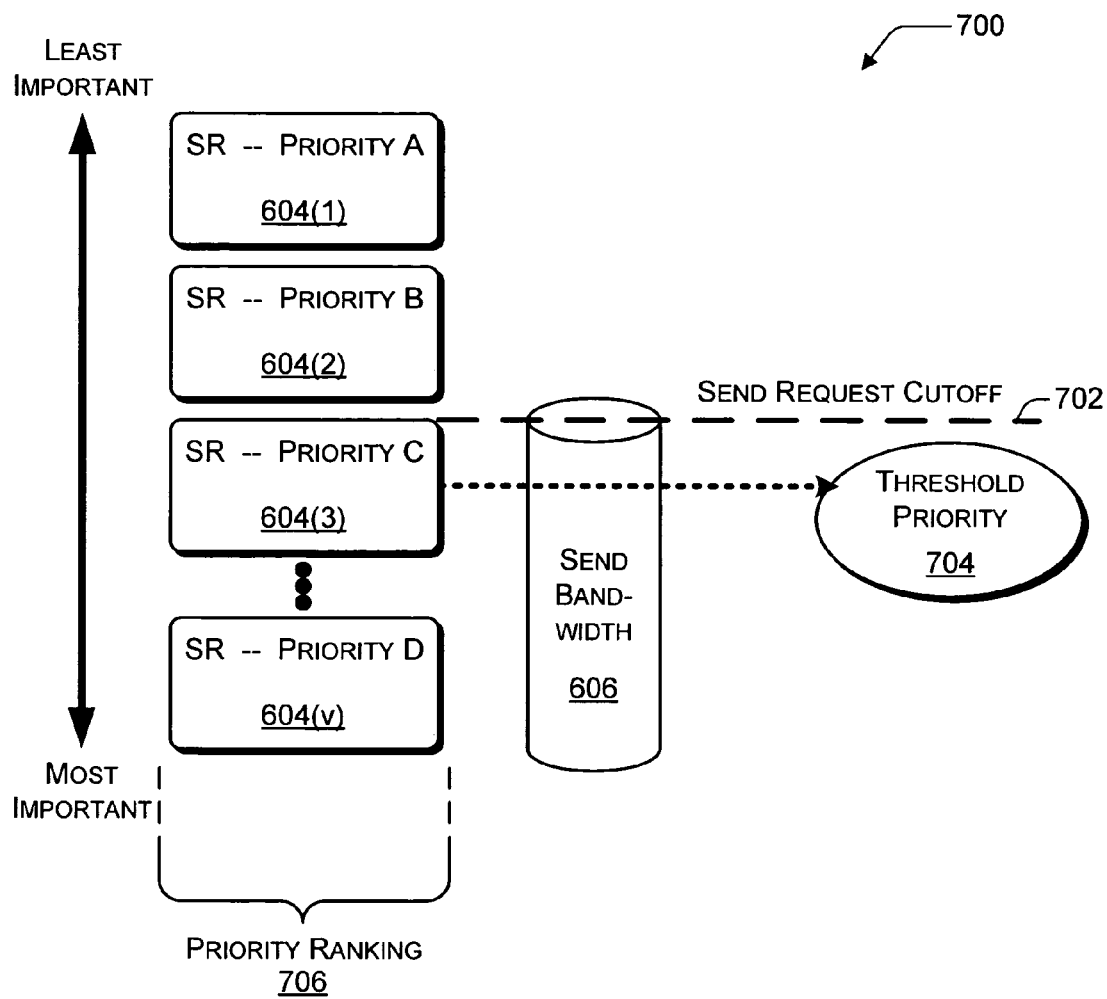
FIG. 7 illustrates a second aspect of the exemplary approach to a priority mechanism for distributed sending of media data.

FIG. 7 illustrates a second aspect 700 of the exemplary approach to a priority mechanism for distributed sending of media data. Send bandwidth 606 is depicted as a tube that can be filled to the brim, but any send requests 604 that spill over are not currently sendable. Four send requests 604(1, 2, 3 . . . v) are shown after ranking by send request ranker 608 from most important (at the bottom) to least important (at the top). Although only four send requests 604 are explicitly pictured in priority ranking 706, many such send requests 604 are usually handled by sender 304 during each timeslot.

As illustrated, send request 604(1) is associated with (unique) priority A, and send request 604(2) is associated with priority B. Also, send request 604(3) is associated with priority C, and send request 604(v) is associated with priority D. In this illustrated example, priority A is less important than priority B, priority B is less important than priority C, and priority C is less important than priority D. Hence, send request 604(v) is applied to send bandwidth 606 first.

Consequently, bandwidth accumulation starts with send request 604(v) and proceeds upwards to send request 604(3) and beyond until a send request 604(2) is reached that cannot fit entirely within the send bandwidth 606. At this point, send requests 604 that do not fully fit within send bandwidth 606 (i.e., send requests 604(1) and 604(2) in the illustrated example) may be discarded by the sender 304 that is implementing this aspect of the priority mechanism because their send requests cannot be honored during the current timeslot.

However, send request 604(2) can alternatively be only partially discarded by the sender such that part of the requested media data can be sent during the current timeslot. Partially discarding a send request but honoring the remainder is likely a minor optimization in most scenarios, so the probable increased throughput is weighed against handling the increased complexity of dividing send requests.

It should be noted that if each media data sub-block is of an identical size and if send requests all specify a single data sub-block (which is not the case for a described implementation and usually not the optimal implementation for maximizing real-world throughput), then bandwidth accumulation may be accomplished by dividing send bandwidth 606 by the bandwidth consumption size of each media data sub-block to produce a selected number of send requests 604 that are to be honored. Relatively more important send requests 604 equal in number to the selected number are then identified as being below a send request cutoff 702.

Send request cutoff 702 corresponds to the least important send request 604 of received send requests 604(1, 2, 3 . . . v) that can be included in the current round of send media data messages 506 without exceeding send bandwidth 606. Any send request 604 that fully or partially exceeds send bandwidth 606 is above send request cutoff 702 and cannot (according to operational protocols) be honored (at least completely) for sending in the current round of send media data messages 506.

Threshold priority 704 for sender 304 for the current timeslot or round under consideration corresponds to the unique priority of the lowest priority send request 604 that fits within the predetermined send bandwidth 606. In an alternative implementation, threshold priority 704 can correspond to the unique priority of the highest priority send request 604 that does not fit within the predetermined send bandwidth 606, as long as schedulers 306 know which scheme senders 304 are using to communicate send request cutoff 702. Also, if all of the send requests 604 that are received at a given sender 304 do not equal or exceed the given sender's send bandwidth 606, that given sender 304 may consider (and therefore broadcast) a threshold priority 704 that equals a minimum possible threshold priority value.

In the illustrated example, threshold priority 704 corresponds to priority C of send request 604(3). This threshold priority 704 is transmitted by sender 304 to multiple schedulers 306 as an indicator of which send requests 604 are not being honored/selected for sending by that sender 304 in the current timeslot and which are being honored/selected, at least up to the point at which threshold priority 704 (e.g., an initial threshold priority 704) is being determined.

Schedulers 306 do not know which send requests 604 will actually be honored/selected for sending by a given sender 304 in the current timeslot until they receive a final threshold priority 704 from that given sender 304. Initial, intermediate, and final threshold priorities 704 are described further below with particular reference to FIG. 9. From receipt of a final threshold priority 704, schedulers 306 know (i) that any send request 604 at least as important as the final threshold priority 704 for which they have received an ACK notification was honored/selected, (ii) that any send request 604 at least as important as the final threshold priority 704 for which they have received neither ACK notification nor non-sent notification may or may not have been honored/selected, (iii) that any send request 604 at least as important as the final threshold priority 704 for which they have received a non-sent notification was not honored/selected for some reason (e.g., due to late reception by sender 304 of send request 604 (i.e., send request 604 may be received after the cutoff time at which the final threshold priority 704 is determined and just before media block sub-block(s) are sent)), and (iv) that any send request 604 less important than the final threshold priority 704 (as described above) was not honored/selected regardless of whether it had previously received an ACK notification for that send request.

Threshold priority 704 can be transmitted by sender 304 as a unicast communication or as a multicast communication. For example, sender 304 can unicast threshold priority 704 to each scheduler 306 that submitted a send request 604, to each scheduler 306 whose submitted send request 604 is not being honored, to each scheduler 306 whose submitted send request 604 is being honored, to schedulers 306 generally (e.g., "broadcast" with multiple unicast communications), and so forth. Alternatively, sender 304 can multicast threshold priority 704 to schedulers 306 generally (e.g., broadcast with a multicast communication). An implementation of how a scheduler 306 may utilize the transmitted threshold priority 704 is described below with reference to FIG. 8 (and further below with reference to FIG. 9).

Figure 8:
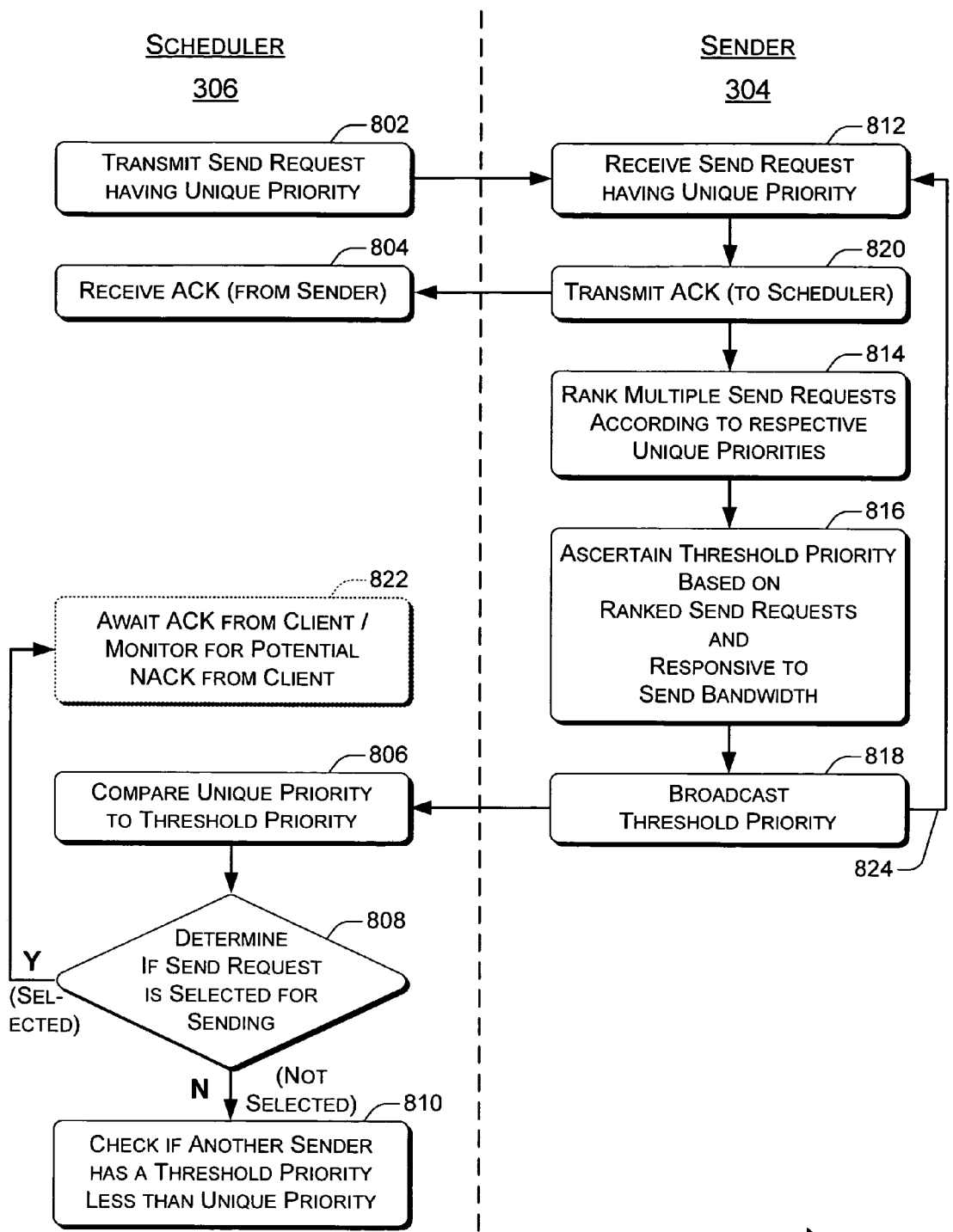
FIG. 8 is a flow diagram that illustrates an exemplary method for a priority mechanism for distributed sending of media data.

FIG. 8 is a flow diagram 800 that illustrates an exemplary method for a priority mechanism for distributed sending of media data. Flow diagram 800 includes eleven (11) blocks 802-822. Although the actions of flow diagram 800 may be performed in other environments and with a variety of hardware and software implementations, FIGS. 5-7 are used in particular to illustrate certain aspects and examples of the method. For example, a scheduler 306 (of a first device 302) may perform the actions of blocks 802-810 and 822, and a sender 304 (of the first or a second device 302) may perform the actions of blocks 812-820.

At block 802, a send request having a unique priority is transmitted. For example, scheduler 306 may transmit a send request 604(*) that is associated with a priority that differs from every other send request 604 (at least in a current timeslot).

At block 812, the send request having the unique priority is received. For example, sender 304 may receive send request 604(*) from scheduler 306. At block 820, an ACK of receipt of the send request is transmitted to the scheduler. For example, sender 304 may transmit an ACK that acknowledges receipt of send request 604(*) to scheduler 306, optionally in dependence upon the unique priority of send request 604(*) and a current threshold priority 704 of sender 304. At block 804, the ACK of receipt of the send request is received from the sender. For example, scheduler 306 may receive the ACK that acknowledges receipt of send request 604(*) from sender 304. Receipt of an ACK for send request 604(*) may also be a factor in the sending selection determination of block 808, which is described below.

Sender 304 may also receive multiple other send requests 604(1, 2, 3 . . . v) from scheduler 306 and other schedulers. At block 814, multiple send requests are ranked according to respective unique priorities. For example, a send request ranker 608 of sender 304 may rank multiple send requests 604(1, 2, 3 . . . v), including send request 604(*), into a priority ranking 706.

At block 816, a threshold priority is ascertained based on the ranked send requests and responsive to a send bandwidth. For example, a threshold priority ascertainer 610 may ascertain a threshold priority 704 based on the ranked send requests 604(1, 2, 3 . . . v) in priority ranking 706 and responsive to a send bandwidth 606. For instance, a priority of a send request 604, such as priority C of send request 604(3), may be ascertained to be threshold priority 704 if the send request 604 is associated with a lowest priority from among those send requests 604 that fall below (or more generally within) a send request cutoff 702 as set or otherwise established by send bandwidth 606.

At block 818, the ascertained threshold priority is broadcast. For example, sender 304 may multicast threshold priority 704 to schedulers 306. The ascertained and broadcast threshold priority is received by multiple schedulers. For example, scheduler 306 may receive threshold priority 704. It should be noted that sender 304 continues its threshold priority analysis based on newly-arriving send requests 604 as indicated by arrow 824 and as is described further below with reference to FIG. 9.

At block 806, the unique priority of the send request is compared to the threshold priority. For example, the priority associated with send request 604(*) may be compared to threshold priority 704. At block 808, it is determined if the send request has been selected for sending (i.e., will be honored) based on the comparing (e.g., assuming that an ACK notification has been received for the send request (as in block 804) and that the received threshold priority is the final threshold priority of the timeslot). For example, scheduler 306 may determine that send request 604(*) has been selected for sending if the priority associated with send request 604(*) is greater than threshold priority 704.

In a described implementation, an ACK notification is transmitted from a sender 304 to a scheduler 306 (as in block 820) when the threshold priority 704 of the sender 304 does not preclude sending the media data of a send request 604. If the current threshold priority 704 already does preclude the media data sending, then no ACK is sent because the broadcast threshold priority 704 will inform scheduler 306 that it is irrelevant whether or not its send request 604 was received by the sender 304 because the requested media data is not being sent regardless.

Although possible, entirely eliminating these ACK notifications for send requests (as illustrated by blocks 820 an 804) is probably inferior in most scenarios in which reliable message delivery cannot be assumed (e.g., in network environments with no intrinsic reliability already built in). More specifically, such elimination is inferior when the packet loss rate is significant (e.g., above approximately half a percent) because requestors would not have any way to know which requests should be retransmitted.

Thus, more generally, scheduler 306 may determine that send request 604(*) has been selected for sending if the following confirming conditions are met: (i) the priority associated with send request 604(*) is greater than or equal to threshold priority 704, (ii) an ACK notification has arrived for send request 604(*) from sender 304, and (iii) threshold priority 704 is marked as final. Scheduler 306 may determine that send request 604(*) has not been selected for sending if the priority associated with send request 604(*) is lower than threshold priority 704.

Further, scheduler 306 may determine that it is not yet possible to determine whether send request 604(*) was or was not selected for sending if (i) the priority associated with send request 604(*) is greater than or equal to threshold priority 704, (ii) no ACK notification has been received for send request 604(*) from sender 304, (iii) no non-sent notification has been received for send request 604(*), and (iv) threshold priority 704 is marked as final. In such a case, which is rare for most scenarios of interest, scheduler 306 may assume that the send request was or was not selected for sending, whichever is more appropriate given the costs involved if an incorrect assumption is made. Also, in some implementations, scheduler 306 may continue to re-send send request 604(*) even after a final threshold priority 704 is received simply in order to determine whether send request 604(*) was selected for sending; however, this is beneficial primarily when the cost of an incorrect assumption is enough to justify the extra memory and processing requirements necessary to keep track of more than one timeslot at a time.

Thus, in short, if all of the above confirming conditions (i)-(iii) are not met, scheduler 306 delays determination of whether send request 604(*) has been selected for sending. In the unlikely event that a timeout occurs before it can be determined whether send request 604(*) has been selected for sending, scheduler 306 may, possibly incorrectly, (i) assume that send request 604(*) was not selected, in which case scheduler 306 will re-request it later (with the possible result of it being sent twice), or (ii) assume that send request 604(*) was selected, in which case the client will send a retry request to fill in any missing media data.

Continuing with flowchart 800, if it is determined that "Yes" the send request has been selected for sending (at block 808), then at block 822 an acknowledgment (ACK) from a destination client is awaited or communications from the destination client are monitored for a potential NACK. For example, scheduler 306 may await a reception acknowledgment message from a client 206 that is the designated destination for media data stipulated in send request 604(*), where the media data is being sent to client 206 by sender 304. Alternatively, scheduler 306 may monitor communications from a client 206 that is the designated destination for media data stipulated in send request 604(*), where the media data is being sent to client 206 by sender 304, for potential NACKs sent by client 206 when it does not receive something it expects.

As indicated by the two options in the dashed block 822, some delivery protocols do not require an ACK from clients 206, and they may instead rely on NACK messages to fill in gaps. In such cases, scheduler 306 takes no special affirmative action after the "Yes" branch from block 808 beyond noting that send request 604(*) was selected for sending and that the referenced media data therefore does not need to be sent again unless a client 206 specifically requests some or all of the referenced media data. Hence, with a NACK-based protocol, scheduler 306 may engage in relatively passive monitoring for NACK communications from clients 206 once a send request 604 has been selected for sending.

If, on the other hand, it is determined that "No" the send request has not been selected for sending (at block 808), then at block 810 it is checked if another sender has a threshold priority that is less than the unique priority of the send request and/or less than the highest assignable unique priority for the send request. For example, scheduler 306 may check another sender 304' that also stores the stipulated media data to see if the threshold priority 704' of sender 304' is lower than the priority already associated with send request 604(*) and/or is lower than the highest priority that can be assigned to send request 604(*). If there is an alternative sender 304, another send request 604(*)' with the same send priority or an increased send priority (e.g., if legitimately adjustable and necessary to find a usable sender) is transmitted from scheduler 306 (i.e., the method of flow diagram 800 may continue at block 802 with a new send request and a new target sender if the send priority is not increased and either the same or a new target sender if the send priority is increased).

One way to legitimately adjust the send priority of a send request 604 is to adjust the option count (i.e., the number of devices 302 that currently cache the desired media data) downward to a value lower than the initially or previously-used value. In other words, the number of senders that are potentially capable of sending the referenced media data block may be "virtually" decreased for purposes of increasing a send priority. This can be allowed because otherwise a situation might arise in which there are two or more senders that could send data for a block were the send request to have a sufficiently high priority, but none of them accept the send request if the option count is set to the actual number of senders that are theoretically capable of sending media data of the media data block.

In an alternative described implementation with respect to block 810, the unique priority may be adjusted (e.g., by lowering an option count) after block 808 but prior to block 810. If the increased unique priority of the would-be send request results in a capable sender having a lower threshold priority, then a new send request may be sent to this other capable sender (e.g, by repeating the action(s) of block 802).

In short, one or more other senders 304 may store a replicated copy of the media data as noted above and as described further below in the section entitled "Media Organization for Distributed Sending of Media Data". The threshold priority 704 of each sender 304 having such a replicated copy may be compared to the current priority and/or the highest priority that can be legitimately associated with send request 604(*) (e.g., by temporarily using a decreased option count, such as an option count of one). If a threshold priority 704' that is lower is discovered, then a second send request 604(*)' may be transmitted to the sender 304' thereof, with the option count set to a low enough value that the send request 604(*) has an associated priority that is higher, or more important, than threshold priority 704'. This sending negotiation, which is described below with reference to FIG. 9, may proceed until send bandwidths 606 of multiple senders 304 are filled and/or until a time available for negotiating a current timeslot expires.

Figure 9:
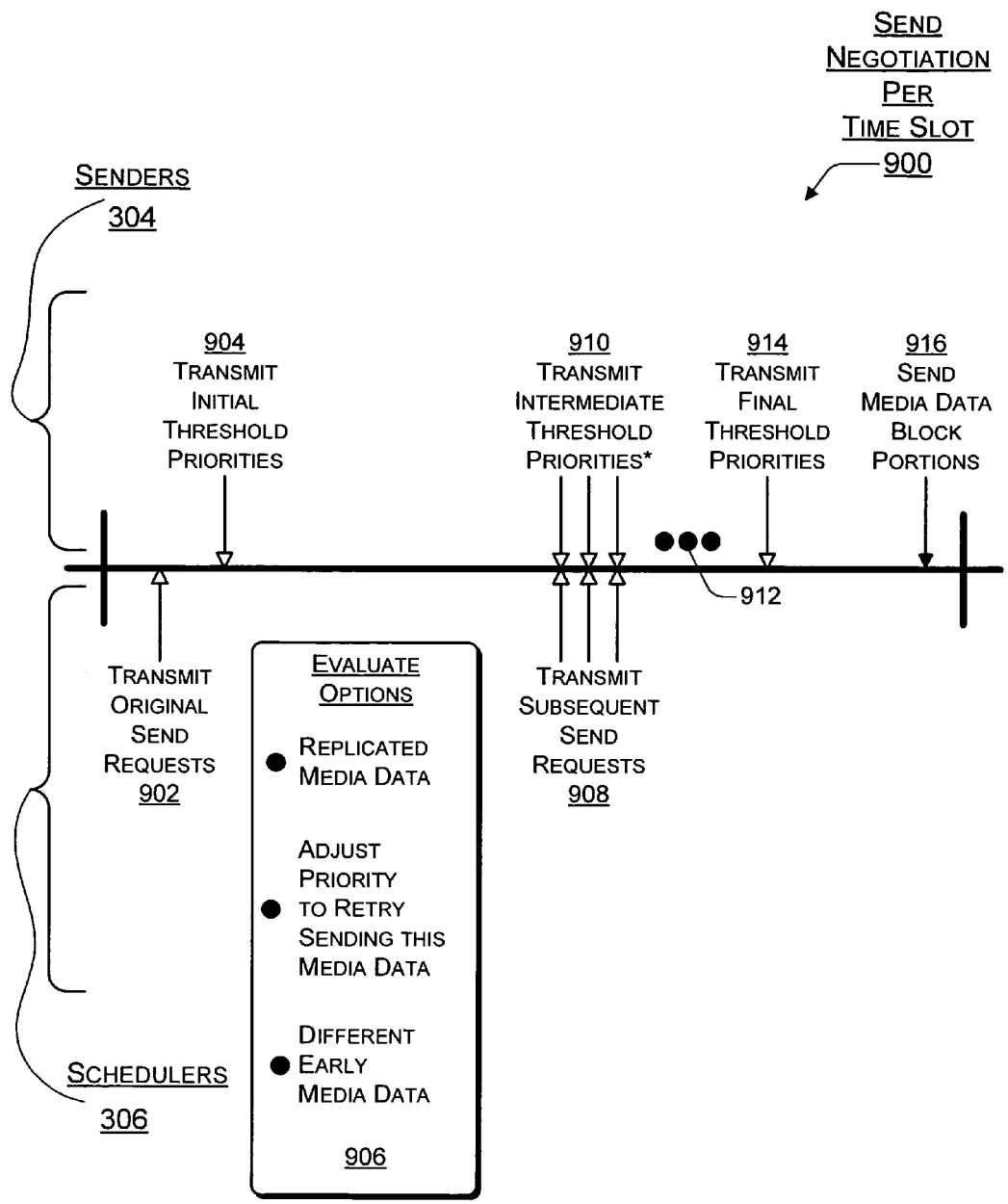
FIG. 9 illustrates an exemplary send negotiation per-time-slot that involves a priority mechanism for distributed sending of media data.

FIG. 9 illustrates an exemplary send negotiation per-timeslot 900 that involves a priority mechanism for distributed sending of media data. For each sending timeslot, a negotiation is performed in an attempt to fill up the send bandwidth 606 of each sender 304 at each device 302 without over-filling the available bandwidth with deadline data send requests alone. The architecture endeavors to utilize a significant percentage (if not all) of each send bandwidth 606 through a number of schemes.

These bandwidth utilization schemes include, for example, media data replication that increases the potential number of capable senders 304 for some or all media data blocks. (Media data replication also increases the total number of clients 206 that can be serviced.) Another scheme relates to sending media data early, before the sending deadline of the media data, so that media data sub-blocks that must (if a streaming failure is to be avoided) be sent to clients 206 at or by a future deadline timeslot are sent in current timeslots.

Yet another bandwidth utilization scheme entails schedulers 306, when taken in the aggregate, being prevented from allocating more than a certain percentage (e.g., 85%) of the overall available send bandwidth capacity when totaling individual deadline-send bandwidths 606 across the multiple senders 304. Each scheduler 306 is configured with a "deadline-only chokepoint" that affects deadline send allocations in future timeslots, but it is not considered when allocating early sends in the current timeslot. While this does not guarantee that every or even any individual sender 304 will be requested to send no more than 85% of its individual send bandwidth 606 (counting only deadline sends that cannot be sent from any other device 302), it does greatly reduce the probability that any sender 304 will be requested to send more than 100% of its send bandwidth 606 (counting only deadline sends that cannot be sent from any other device 302).

Because senders 304 are often requested to utilize the remainder of their send-bandwidth 606 by sending early data and thus total sends counting both deadline and non-deadline sends of a sender 304 often essentially fill send bandwidth 606 of that sender 304, it is apparent that preventing the aggregate deadline data utilization of send bandwidths 606 of multiple senders 304 from exceeding 85% (for example) does not preclude using the remaining 15% for early data. An exemplary scheduling scheme and pipeline management approach is described further below in the section entitled "Scheduling Scheme for Distributed Sending of Media Data".

As illustrated, send negotiation 900 occupies at least part of a timeslot. Activities in the upper portion of send negotiation 900 are performed by senders 304. Activities in the lower portion of send negotiation 900 are performed by schedulers 306.

Schedulers 306 initially determine what media data they wish to send to which clients 206 based on deadlines, network choke points, and so forth. Based on these determinations, schedulers 306 formulate send requests 604 (not separately shown in FIG. 9). These send requests 604, which are based on default values instead of threshold priority information, are transmitted as original send requests 902 from schedulers 306. It should be noted that threshold priorities 704 for all senders 304 at the beginning of each timeslot may be considered to be a minimum threshold priority value as set by a given system's design. The intended individual senders 304 receive original send requests 902.

As described above with particular reference to FIGS. 6-8, respective senders 304 ascertain respective threshold priorities 704 responsive to the original send requests 902. These ascertained respective threshold priorities 704 are transmitted from respective senders 304 as initial threshold priorities 904. Schedulers 306 receive initial threshold priorities 904.

Responsive to the received initial threshold priorities 904, schedulers 306 are able to evaluate options 906. In other words, empowered by the knowledge of initial threshold priorities 904 of senders 304 for the current timeslot, schedulers 306 can evaluate options that facilitate send bandwidth 606 utilization and/or media data dissemination to associated clients 206. For example, if replicated media data for stipulated media data from a rejected send request 604 is present at a different sender 304 on a different device 302, a new send request 604 that is intended for that different sender 304 may be formulated. This formulation is appropriate if the send priority of the rejected send request 604 is already or can be adjusted to be (e.g., by lowering an option count to produce a priority that is) higher than the threshold priority 704 of the different sender 304. Alternatively, media data with a later deadline that is not required by a destination client 206 until an even later time may be stipulated in another send request 604, depending on threshold priorities of other senders 304 that are associated with such later early data.

These new send requests 604 are transmitted as subsequent send requests 908 from schedulers 306. The intended individual senders 304 receive subsequent send requests 908. After adding those subsequent send requests 908 that fall within respective send request cutoffs 702 where possible, respective senders 304 ascertain new respective threshold priorities 704. These new ascertained respective threshold priorities 704 are transmitted from respective senders 304 as intermediate (non-final) threshold priorities 910. Schedulers 306 receive intermediate threshold priorities 910. In this manner for a described implementation, threshold priorities 704 for senders 304 increase within each timeslot during send negation 900 but do not decrease. This facilitates rapid stabilization and thus completion of send negotiation 900.

As indicated by ellipses 912, send negotiation 900 may continue with the exchange of additional subsequent send requests 908 and corresponding intermediate* threshold priorities 910, until what would otherwise be an intermediate* threshold priority is marked as final. In other words, as the negotiation time nears an end, senders 304 mark their threshold priorities as final threshold priorities 914 and transmit them to schedulers 306. After receiving final threshold priorities 914, schedulers 306 cease reevaluating sending options, formulating new send requests, and transmitting such new send requests. Schedulers 306 do, however, formulate and transmit new original send requests 902 in the next succeeding timeslot. It should be noted that send negotiation 900 also ceases (in a de facto cessation if not an official cessation) when all schedulers 306 have determined that no media data under consideration for the current timeslot has a maximum assignable priority that is greater than the individual schedulers' views of any usable senders' current (but not necessarily final) threshold priority 704.

Although three subsequent send request 908 transmissions and three intermediate threshold priority 910 transmissions are shown, none, one, two, or more than three may alternatively occur. If none occur, then the initial threshold priority 904 is also the final threshold priority 914. It should be understood that there need be no formal rounds internal to each timeslot. Send negotiation per time slot 900 is an organic process in which senders 304 and schedulers 306 communicate their new send requests 604 and current threshold priorities 704 until time expires and a current threshold priority 704 is marked final. Hence, the exchange of messages may be unsynchronized, may be overlapping, etc. between and among different schedulers 306 and senders 304.

In a more-specific described implementation, the back and forth message-exchanging negotiation may happen several times, not just once or twice. Senders 304 ACK send requests 604 that are greater than their current threshold priority 704 while possibly updating their new current threshold priority 704 if a send request 604 is being received for the first time and if the threshold priority 704 is thereby affected. Schedulers 306 retransmit send requests 604 that still have a greater unique priority than the scheduler's view of the sender's current threshold priority 704 if the send requests 604 have not previously resulted in a received ACK. NON_SENT messages may be sent when a send request 604 (e.g., a subsequent send request 908) with a higher unique priority than a sender's final threshold priority 914 arrives at the sender 304 after transmission of its final threshold priority 914, but this is optional. Schedulers 306 may send a NON_FINAL message to a sender 304 after final threshold priority 914 transmissions if a "final" threshold priority from the sender 304 has not been received, but this too is optional. As a related option, senders 304 may resend their final threshold priority 914 if they receive a NON_FINAL message.

As described above, send negotiation 900 is eventually terminated so that scheduled and accepted media data block portions 916 may be sent from senders 304 to clients 206. For example, send negotiation 900 may be terminated after a predetermined period of time (e.g., some fraction of the timeslot) has elapsed. Any messages being passed with reference to the current timeslot at the expiration of that period of time are ignored, and original send requests 902 for the immediately succeeding timeslot may be prepared and then transmitted. Other termination provisions may alternatively be instituted.

Media Organization for Distributed Sending of Media Data

Figure 10:
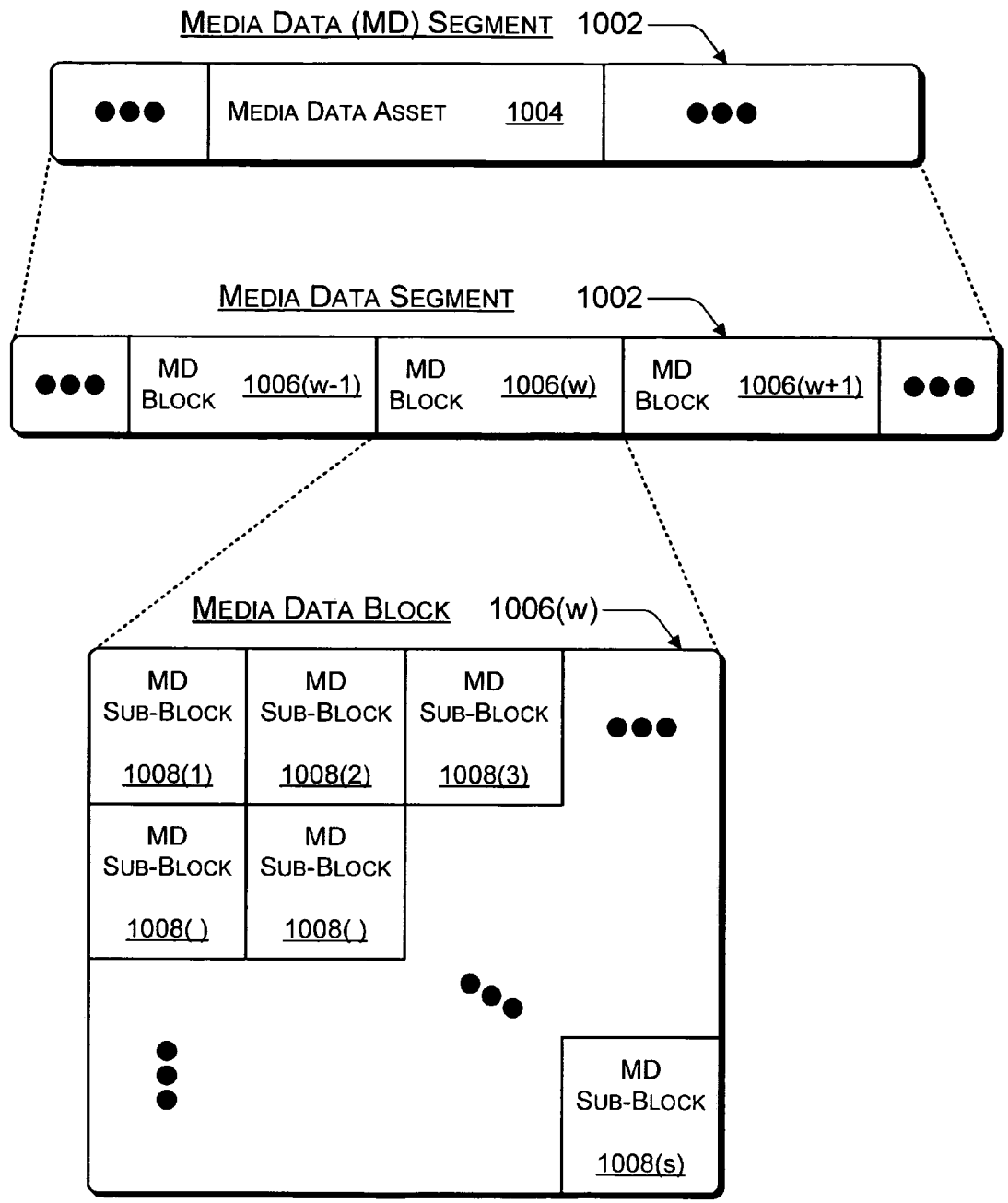
FIG. 10 illustrates an exemplary logical organization of media data.

FIG. 10 illustrates an exemplary logical organization 1000 of media data. A media data (MD) segment 1002 is divided into one or more media data assets 1004. By way of a content-oriented example, a media data segment 1002 may correspond to a day of a news channel, nationally broadcast programming for a major network for any given 24 hour period or any other length period (e.g., 16 hours), a pay-per-view movie, and so forth. Each media data asset 1004 may be, for example, some divided portion (e.g., a sub-region) of media data segment 1002 or the entirety of media data segment 1002. Content-oriented examples of possible media data assets 1004 include a 30 minute portion of an all-news channel, an hour-long drama from network television, and so forth.

However, a media data asset 1004 is conceptually flexible depending on the media data contents. For example, a media data asset 1004 may be a relatively short snippet of media data such as a movie short, an individual news story, and so forth. On the other hand, a media data asset 1004 may be a relatively long piece of media data such as a full feature-length movie. The full feature-length movie media data asset 1004 may also happen to correspond to the entirety of its media data segment 1002.

From a technical perspective, a media data segment 1002 may be a continuous time line of media data from an encoder that can be continuously decoded. If the encoder ceases encoding, significantly alters its encoding parameters, or is changed to another encoder, a different media data segment 1002 is started. The entirety of each desired media data segment 1002 is typically retained. However, they may be divided into sub-regions, which are capable of being referenced specifically and individually, such as media data assets 1004 so that popularity can be focused to at least a per-media-data-asset 1004 level. Popularity may also be tracked at a finer level of detail, such as on a per-block basis, a per-half-hour basis, a per-sub-block basis, a per-byte basis, or at any other level of detail. Regardless of the level of detail at which popularity is actually tracked, an estimated popularity of a specific block can be easily derived. Popularity is described further below, especially with reference to FIGS. 12 and 13.

Each media data segment 1002 is sub-divided into one or more media data blocks . . . 1006(w−1), 1006(w), 1006(w+1) . . . Although most media data segments 1002 likely contain many media data blocks 1006, a given media data segment 1002 may contain as few as three, two, or even a single media data block 1006. In a described implementation, media data blocks 1006 are the level of media data granularity that is distributed across devices 302. For example, the presence of distributed media data blocks 1006 is represented by media data blocks 408(X), 408(X+1), 408(Y), and 408(Y+1) in FIGS. 4 and 5. Media data blocks 1006 are approximately one megabyte (MB) in size, but other sizes may alternatively be implemented. The media data block size for video data may be different than the media data block size for audio data within the same segment. The media data block size may also be variable within a single stream, but this is rarely done.

Each media data block 1006, such as media data block 1006(w), is further sub-divided into media data sub-blocks 1008(1), 1008(2), 1008(3) . . . 1008(s). In a described implementation, media data sub-blocks 1008 are the level of media data granularity that is specified for sending to clients 206 in a given timeslot. Hence, a media data sub-block 1008 is the unit of media data that is stipulated for sending in each send request 604 (e.g., is the level of media data granularity for sending). However, a single send request 504/604 can request the sending of multiple media data sub-blocks 1008, instead of only requesting the sending of a single media data sub-block 1008. In other words, although each media data sub-block 1008 may be packet-sized, a single send request 604 can result in the sending of multiple such media data sub-blocks 1008 (and thus their packets) to a client 206.

Figure 11:
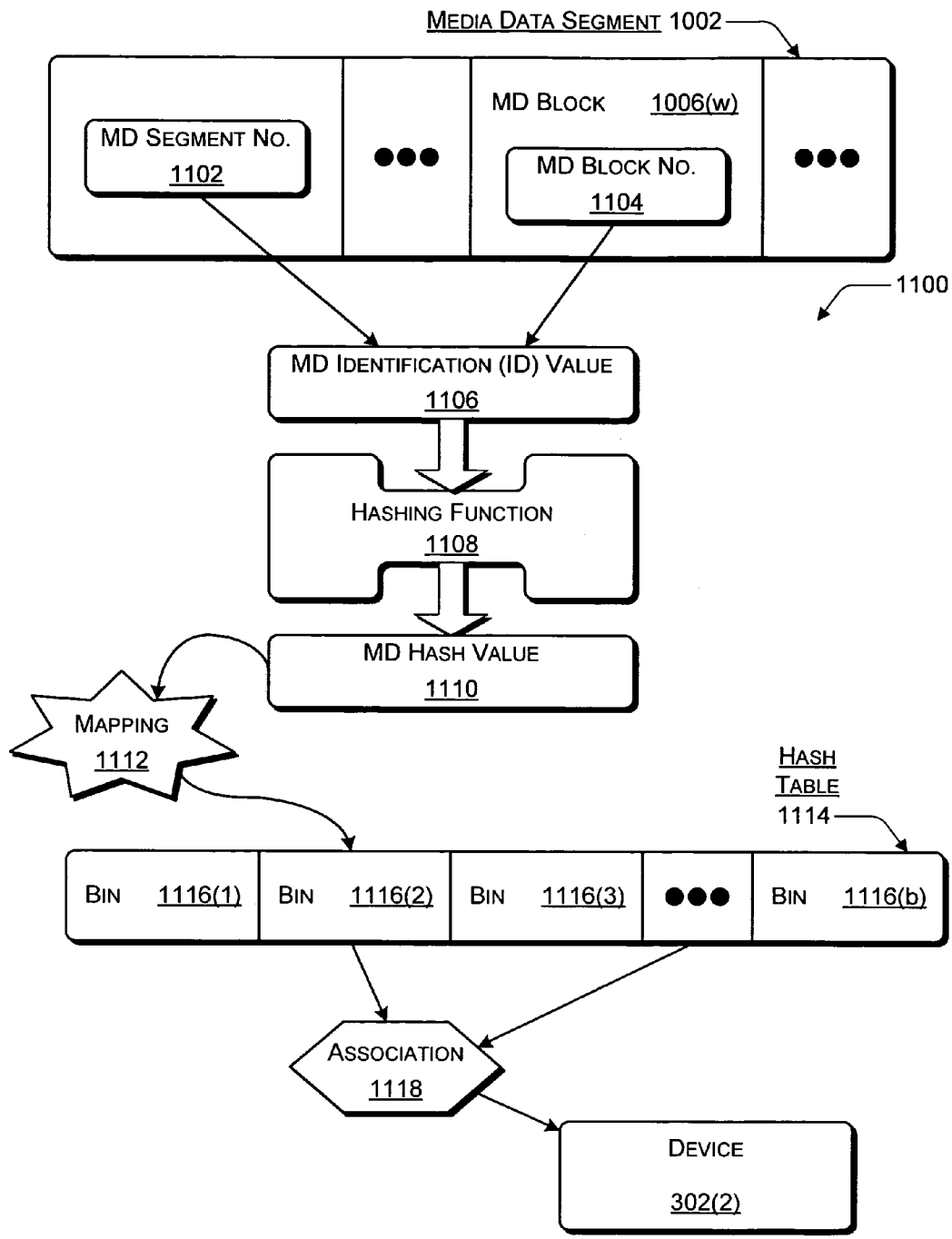
FIG. 11 illustrates an exemplary approach to physically locating media data that includes a hash table.

FIG. 11 illustrates an exemplary approach 1100 to physically locating media data that includes a hash table 1114. Media data block 1006(w) of media data segment 1002 is shown being located on a device 302, which is device 302(2) in this example. Physically locating media data may refer to locating media data (e.g., a media data block 1006) (i) for purposes of placing the media data in a device 302 location or (ii) for purposes of requesting that the device 302 having the media data location send the media data to a client 206.

In a described implementation, each media data segment 1002 and individual media data block 1006 include or correspond to an identifying number. As illustrated, media data segment 1002 includes a media data segment number 1102, and media data block 1006(w) includes a media data block number 1104. Each media data segment 1002 in the system may be assigned a unique media data segment number 1102 in a sequential fashion or by using globally unique IDs, or in some other fashion, as long as they are unique. Within a given media data segment 1002, each media data block 1006 is sequentially assigned a unique media data block number 1104. The sequentially-assigned media data block numbers 1104 can also be used for video processing ordering.

Media data segment number 1102 and media data block number 1104 are combined (e.g., added, concatenated, etc.) to derive a media data identification (ID) value 1106. Media data identification value 1106 is applied to a hashing function 1108 to produce a media data hash value 1110. In a described implementation, hashing function 1108 employs a linear feedback shift register (LFSR) with two 32-bit values (from media data segment number 1102 and media data block number 1104). However, alternative hashing functions 1108 may instead be employed, including non-LFSR functions and/or functions that use values of different bit-lengths.

Media data hash value 1110 is mapped at mapping 1112 onto hash table 1114. Hash table 1114 includes multiple bins 1116(1), 1116(2), 1116(3) . . . 1116(b). Specifically, media data hash value 1110 is mapped 1112 onto a bin 1116 of hash table 1114. In a described implementation, mapping 1112 includes taking the remainder when media data hash value 1110 is divided by the size "b" of hash table 1114. As illustrated, media data hash value 1110 is mapped 1112 to bin 1116(2) of hash table 1114.

Each bin 1116 of hash table 1114 has an association 1118 with at least one device 302. In an implementation that is described further below with reference to FIG. 13, each bin 114 has an association with two devices 302. For example, a first device 302 may have a primary role with a given bin 1116 while a second device 302 has a secondary role with the given bin 116. The roles and associations with bins 1116 may alternatively be defined with respect to senders 304, instead of actual devices 302; an example having associations 1118 between bins 1116 and senders 304 is described further below with reference to FIG. 13.

As illustrated, bin 1116(2) is associated 1118 with device 302(2). Hence, device 302(2) has a e.g. primary or secondary role with bin 1116(2). Media data block 1006(w) is therefore locatable at device 302(2) and stored in RAM thereof in a RAM striping implementation.

In a described implementation, the number "b" of bins 1116 is greater than the number "n" of devices 302. For example, if n=500, then b may equal 131,071. As a result, and as indicated by the second arrow extending from hash table 1114 to association 1118, each device 302 is associated with multiple bins 1116. Associating multiple bins 1116 to each device 302 facilitates recoveries from failures of devices 302 because the media data storage and sending responsibilities of a failed device 302 may be quickly spread among as many devices 302 as there are bins 1116 associated per device 302. Nevertheless, the number "b" of bins 1116 of hash table 1114 is sufficiently small so that each device 302 can afford to store a copy of hash table 1114 for quick reference.

Each device 302 that is associated 1118 with a given bin 1116 is responsible for having in RAM the media data blocks 1006 that ultimately map 1112 (after hashing 1108) to the given bin 1116. If a requested media data block 1006 is not in RAM, then the associated device 302 retrieves it from mass storage of media data 310 (of FIG. 3). Regardless, the associated device 302 has a primary responsibility role for sending to clients 206 media data blocks 1006 that map 1112 to the given bin 1116. However, for highly popular media data, another device 302 has a secondary responsibility role for sending media data blocks 1006 that map 1112 to the given bin 1116. These primary and secondary roles are described further below with reference to FIG. 13, and determining media data popularity is described below with reference to FIG. 12.

Figure 12:
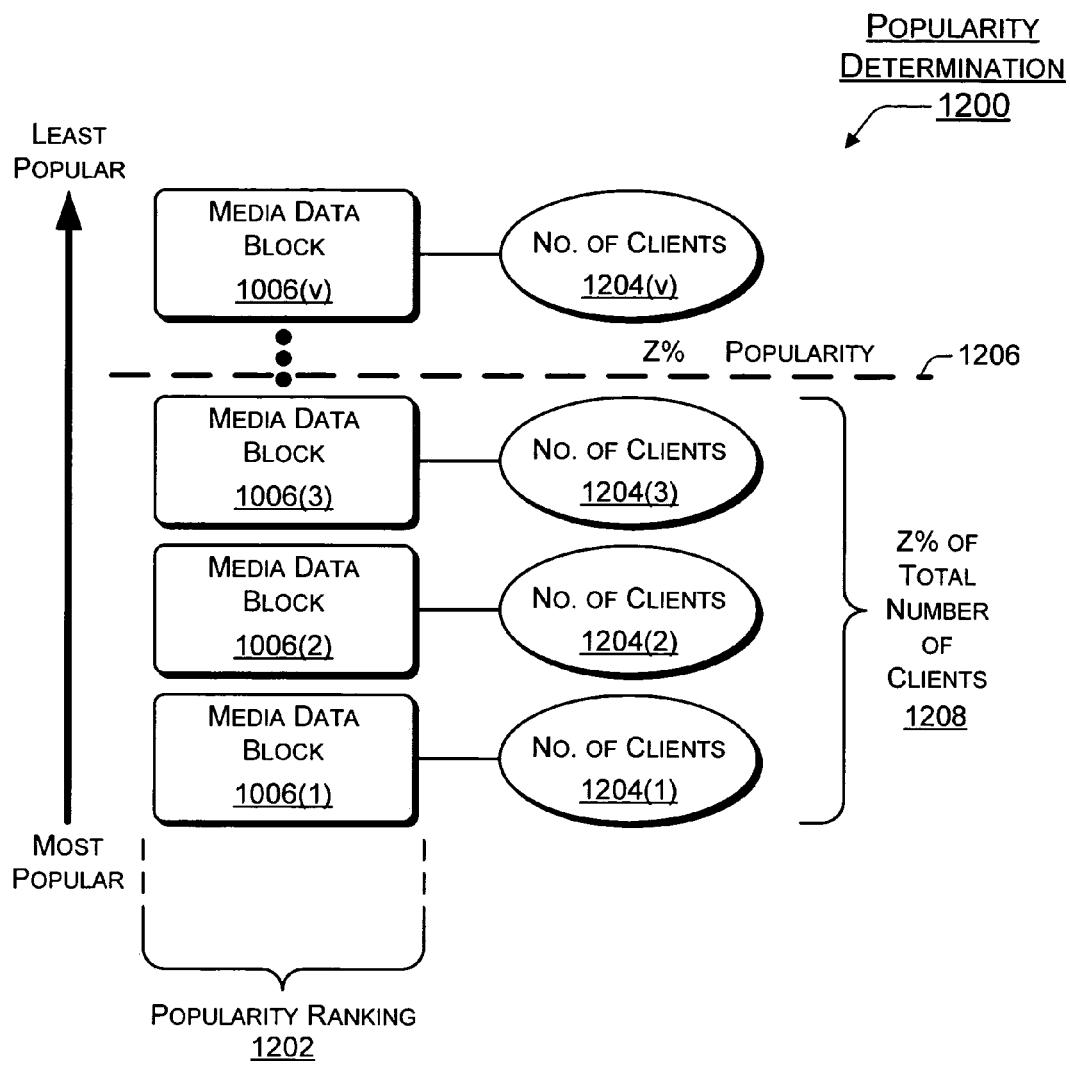
FIG. 12 illustrates an exemplary approach to a popularity determination for media data.

FIG. 12 illustrates an exemplary approach to a popularity determination 1200 for media data. A given percentage of media data popularity does not necessarily equate to the same percentage of media data memory size or media data asset proportion. Exemplary popularity determination 1200 determines media data blocks that amount to Z % of the popularity 1206. Popularity determination may alternatively be performed on a per-asset basis, a per-track basis (e.g. an audio track in a particular language vs. an audio track in another language), a per-sub-block basis, a per-byte basis, or at any other level of detail/memory size by approximating the popularity of all media data at that level of detail as being equal.

Media data blocks 1006 are ranked from most popular to least popular in popularity ranking 1202. As illustrated, media data blocks 1006 are ranked from media data block 1006(1) to media data block 1006(2) to media data block 1006(3) to . . . media data block 1006(v). It should be noted that popularity ranking 1202 need not necessarily include media data blocks 1006 that are less popular than the Z% popularity level 1206. It should be noted that media data blocks 1006 need not be considered individually if popularity determination 1200 is performed on a per-segment, per-asset, per-track, or any larger level of detail than the media data block level.

Each respective media data block 1006(1, 2, 3 . . . v) has been requested by a respective number of clients 1204(1, 2, 3 . . . v). Popularity ranking 1202 of media data blocks 1006 is effectuated with consideration of the number of requesting clients 1204(1, 2, 3 . . . v). In other words, the number of requesting clients 1204(1) is greater than the number of requesting clients 1204(2), which is greater than the number of requesting clients 1204(3), and so forth.

As illustrated, the number of requesting clients 1204(1), 1204(2), and 1204(3) total to Z% of the total number of clients 1208 to which media data is currently being disseminated. Hence, media data blocks 1006(1), 1006(2), and 1006(3) comprise Z% of the popularity 1206 in the system. This Z% of the popularity 1206 is replicated as described further below with reference to FIG. 13.

In a described implementation, Z% of the popularity 1206 that is replicated corresponds to 15%. It should be understood that 15% of the requests may be for 5% of the media data, in which case 5% of the media data is replicated in order to replicate 15% of the popularity. Popularity tracking can be performed on a per-media-data-block 1006 basis, but other media data granularities may alternatively be tracked for popularity and replication purposes. Regardless of the granularity at which popularity is tracked, popularities may be compared in terms of popularity per byte.

For the sake of clarity, popularity determination 1200 as illustrated in FIG. 12 conceals a further complicating subtlety. In a described implementation, popularity is determined on a per-equal-size-block (and thus a per-byte) basis in order to at least improve if not optimize RAM usage. In this described implementation, popularity in terms of requests is tracked on a per-media-data-asset 1004 basis.

However, popularity ranking 1202 is also created responsive to a per-byte basis. For example, each number of clients 1204 (which is tracked at the media data asset 1004 level and represents the number of clients actively viewing the media data asset, or an average over recent time of such a number) is divided by the total number of media data blocks 1006 in the corresponding media data asset 1004 and the result is further divided by the size in bytes of each media data block 1006. Using the resulting per-byte popularity value, popularity ranking 1202 of media data blocks 1006 is created in popularity determination 1200.

To provide a clarifying example, a shorter media data asset 1004 has a higher per-byte popularity than a longer media data asset 1004 that has an equal number of current client requesters. If (i) the shorter media data asset 1004 has two media data blocks 1006 and the longer media data asset 1004 has ten media data blocks 1006 of the same size and (ii) each media data asset 1004 has 100 current requesting clients 206, then there are more current requesting clients 206 per-media-data-block 1006 (and per-byte) for the shorter media data asset 1004 at any given instant. Causing the shorter media data asset 1004 and the media data blocks 1006 thereof to have the higher popularity in this context results in a more efficient usage of RAM-cached media data. An alternative approach that provides an equivalent per-byte popularity ranking result is to track the total number of bytes of a media data asset that are requested by a client during a session since the most recent update of the popularity metric. This total number of requested bytes of the media data asset is divided by the total size of the media data asset in bytes, and this quotient is then factored into the popularity metric periodically or when the session is over.

Using the per-byte popularity value, media data may be manipulated at the media data block 1006 level responsive to current popularity. Such media data manipulations, including replication and cached media data overflow purges, are described further below with reference to FIG. 13.

Although an implementation described above relies on popularity tracking at a per media-data-asset 1004 granularity, popularity may alternatively be tracked at other levels of media data granularity. For example, media data popularity may be tracked at a per media-data-block 1006 granularity level (in which case the popularity percentages are implicitly on a per-media-data-block 1006 basis for popularity ranking 1202 purposes). Furthermore, media data popularity may be tracked at a per media-data-block-set granularity level in which the set is a predetermined number of media data blocks 1006, such as ten media data blocks 1006.

Figure 13:
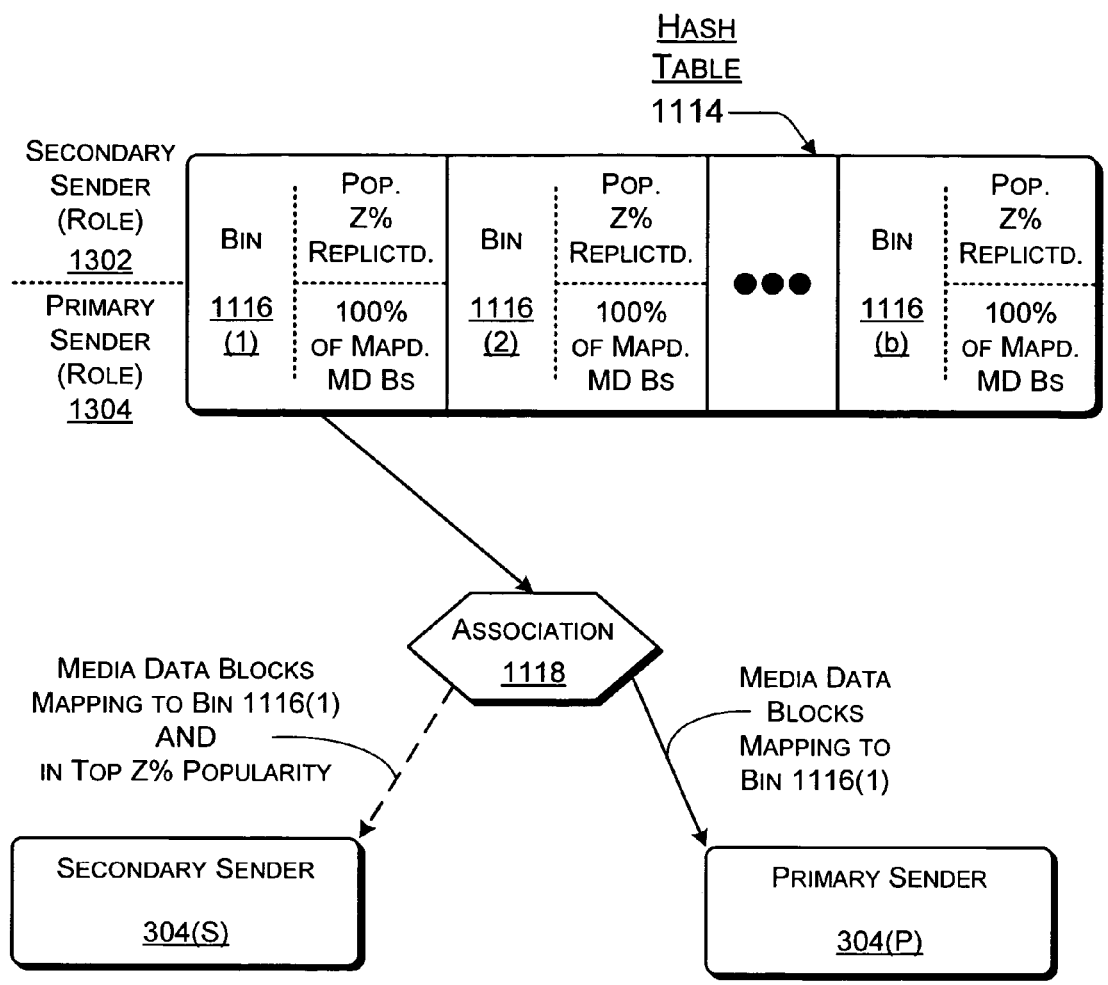
FIG. 13 illustrates an exemplary hash table for locating media data, including replicated media data.

FIG. 13 illustrates an exemplary hash table 1114 for locating media data, including replicated media data. Instead of each bin 1116 being associated with a single sender 304, each bin 1116 is associated 1118 with a primary sender 304(P) and a secondary sender 304(S) as well as optional tertiary and further senders. Generally, each bin 1116 is divided into a primary sender role 1304 and a secondary sender role 1302.

Primary senders 304(P) having primary sender roles 1304 are responsible for 100% of media data blocks 1006 that are mapped to a given bin 1116. Secondary senders 304(S) having secondary sender roles 1302 are responsible for the top Z% of the popular media data blocks 1006 that are mapped to a given bin 1116. Consequently, Z% of the popularity of any given bin 1116 is replicated at the sender 304 having the secondary sender role 1302. As described above, replicating Z% of the popularity of the media data does not necessarily equate to having to replicate Z% of the size of the media data.

With specific reference to bin 1116(1), primary sender 304(P) is associated therewith as having primary sender role 1304, and secondary sender 304(S) is associated with bin 1116(1) as having secondary sender role 1302. Hence, media data blocks 1006 that map (e.g., through hashing) to bin 1116(1) can be sent from primary sender 304(P). Those media data blocks 1006 that map to bin 1116(1) and are part of the top Z% of current popularity in bin 1116(1) are replicated at and may also be sent from secondary sender 304(S).

Secondary senders 304(S) may therefore be used to send media data blocks 1006 of a given bin 1116 that are part of the top Z% of current popularity. This is especially useful for subsequent send requests 908 (of FIG. 9) that are transmitted after a scheduler 306 learns that an original send request 902 will not be honored by a primary sender 304(P) based on an initial threshold priority 904 that was received from the primary sender 304(P).

Although not shown in FIG. 13, there may be additional sender roles (e.g., tertiary, quaternary, etc.) defined by hash table 1114 for media data mapped to bins 1116 thereof. Also, each additional sender role may optionally be for a different popularity percentage. For example, a tertiary sender role may replicate the top 10% of the popularity. In such an example, three senders are responsible for the top 10% of popularity, two senders are responsible for the top 15% of popularity, and one sender is responsible for all 100% of popularity. A scheduler 306 therefore has three sender 304 options if the send request is for media data in the top 10% of popularity. Other numbers of senders 304 and popularity replication percentages may alternatively be used.

Primary senders 304(P) are responsible for 100% of media data blocks 1006 that are mapped to a given bin 1116. However, respective devices 302 of respective primary senders 304(P) may not have sufficient RAM to constantly store all media data blocks 1006 of a given bin 1116. Consequently, a primary sender 304(P) loads requested media data block(s) 1006 from mass storage of media data 310 onto a respective device 302 of primary sender 304(P) upon request from a scheduler 306. Latencies arising from accessing mass storage of media data 310 are ameliorated by using a look-ahead scheme. This looking-ahead, along with related media-data-locking, is described further herein below in the section entitled "Scheduling Scheme for Distributed Sending of Media Data".

In a described implementation, when a "new" media data block 1006 is loaded by a sender 304, an "old" media data block 1006 is purged to provide space in memory 404 of a device 302 of sender 304. Selection of the old media data block 1006 to be purged is made based on media data popularity. For example, in a given bin 1116, a media data block 1006 that is least popular is selected for purging and replacement. However, if the least popular media data block 1006 is locked due to a look-ahead procedure, the next least popular media data block 1006 is considered for purging instead, and so on.

Figure 14:
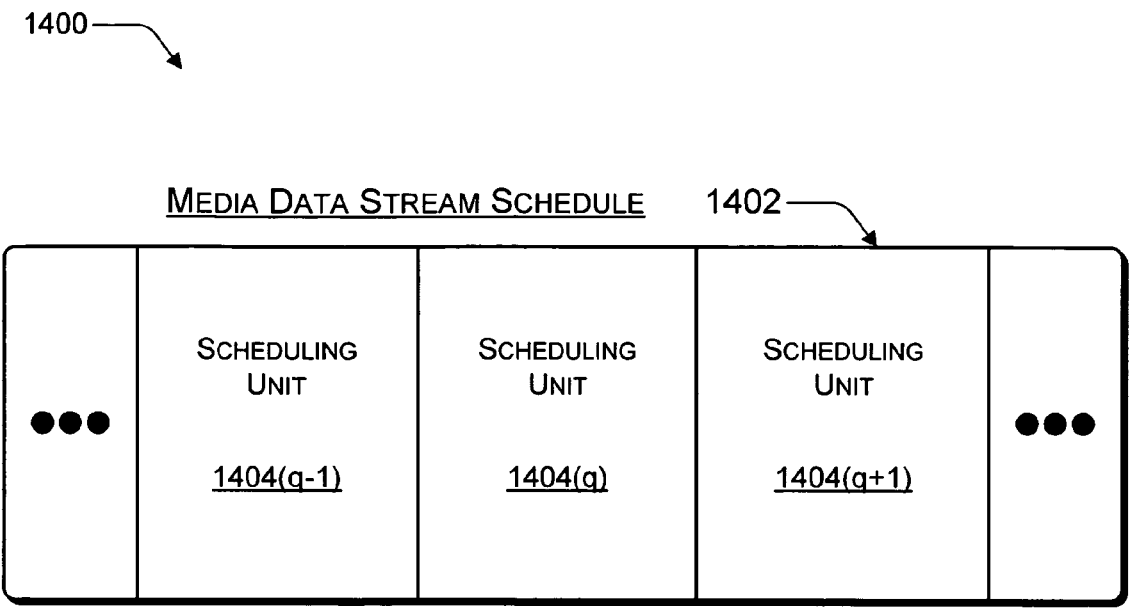
FIG. 14 illustrates an exemplary organization of media data supporting information.
Figure 14:
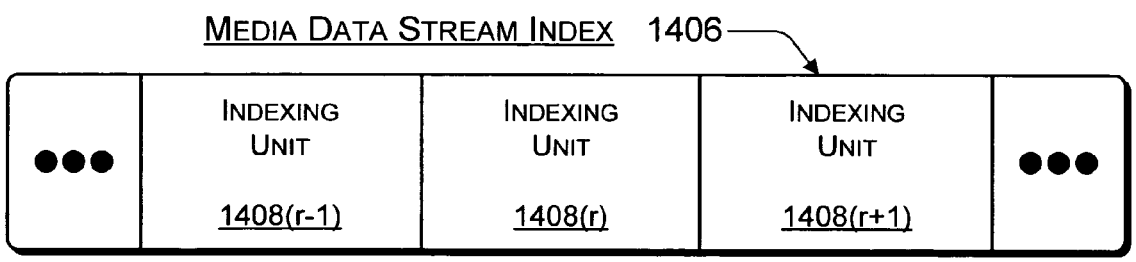

FIG. 14 illustrates an exemplary organization 1400 of media data supporting information. Media data supporting information includes information that supports the presentation of audio/visual media data information. Organization 1400 includes media data stream schedule 1402 and media data stream index 1406. Each media data stream schedule 1402 is associated with a particular media data segment 1002, and each corresponding media data stream index 1406 (if also present) is likewise associated with the particular media data segment 1002.

In a described implementation, each media data stream schedule 1402 includes information that is used by schedulers 306 to establish a streaming schedule that meets its obligations to an associated destination client 206 that is assigned thereto. Schedulers 306 use media data stream schedules 1402 to ensure that media data 408/1004/1006/1008 arrive in time to be processed and displayed without a streaming failure. Each media data stream index 1406 indicates multiple points of random access to the associated media data segment 1002. For example, media data stream index 1406 may include the locations of I frames for certain types of encoded media data (e.g., Moving Pictures Expert Group (MPEG)-encoded media data).

As illustrated, media data stream schedule 1402 includes multiple scheduling units 1404, including scheduling units 1404(q−1), 1404(q) . . . 1404(q+1). Media data stream index 1406 includes multiple indexing units 1408, including indexing units 1408(r−1), 1408(r) . . . 1408(r+1). The number of scheduling units 1404 and indexing units 1408 do not necessarily correspond to the number of media data blocks 1006 in the associated media data segment 1002. Hence, a single scheduling unit 1404 may provide supporting information for multiple media data blocks 1006. Although media data stream schedule 1402 is likely to be larger than media data stream index 1406, their relative sizes are not necessarily indicated in FIG. 14.

Each media data stream schedule 1402 may be stored in its entirety at each device 302 for access by the scheduler 306 thereat. For a three-hour media data segment 1002, its associated media data stream schedule 1402 may be approximately 200 kB, which is manageable for relatively small media data systems, with each scheduling unit 1404 being about 1-8 kB. However, for improved scalability in a described implementation, scheduling units 1404 of each media data stream schedule 1402 are distributed across multiple devices 302. When a scheduler 306 wishes to access a particular scheduling unit 1404, it is located using hash table 1114.

Scheduling units 1404 are therefore distributed across devices 302 using the same hashing function 1108 and hash table 1114 as is used for distributing media data blocks 1006. Consequently, each media data stream schedule 1402 and individual scheduling unit 1404 thereof has a number for determining an identification value for application to hashing function 1108. These numbers may be independent of the associated media data segment 1002 and media data blocks 1006 thereof that are supported by the scheduling units 1404, or they may be related.

For example, a number for a particular media data stream schedule 1402 may be identical or similar to a media data segment number 1102 of an associated particular media data segment 1002, with the numbering of the scheduling units 1404 continuing the numbering of the media data blocks 1006. Alternatively, a media data segment 1002 may have an overarching identifying number with each of media data asset 1004, media data stream schedule 1402, and media data stream index 1406 (if included) having substream identifiers that are based on the overarching identifying number. Other numbering relationships may also be implemented.

More specifically, media data stream index 1406 is a file that lists seek points (random-access points) in an associated media data segment 1002 and gives an offset into the associated media data segment 1002 for that seek point. The entries of media data stream index 1406 are sorted by media time. Media data stream schedule 1402 is a more-detailed form of a media data stream index 1406. Media data stream schedules 1402 include information for ascertaining a synchronization point for seeking to in an associated media data segment 1002, but they are generally more cumbersome than media data stream indexes 1406 for seeking because they also contain non-random-access locations.

Media data stream schedule 1402 addresses the frames or chunks of frames (in video or audio) of the associated media data segment 1002. It also includes the decode time stamp (DTS) of each as well as the size of each in bytes or packets. It is sorted by decode time stamp (DTS), including possibly reverse DTS.

The distinct nature of media data stream schedule 1402 enables the scheduling algorithm that is performed by schedulers 306 to be separated from the audio/visual information of the associated media data segment 1002. It should be understood that media data stream schedule 1402 and/or media data stream index 1406 are exemplary approaches to organizing media data information that supports the presentation of audio/visual media data information and that alternative organizational implementations may be employed instead.

Scheduling Scheme for Distributed Sending of Media Data

Figure 15:
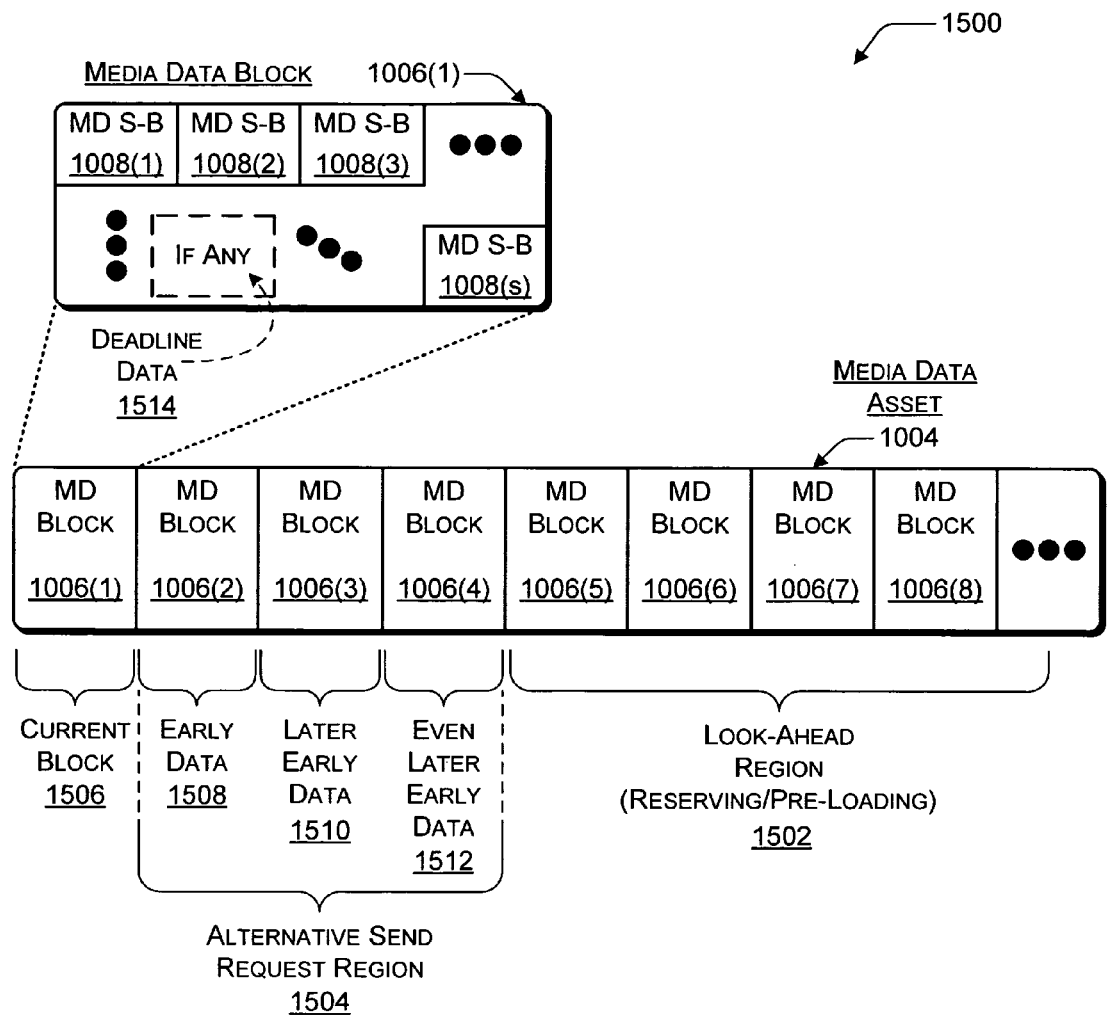
FIG. 15 illustrates exemplary media data characterizations, including a look-ahead region, that indicate differing media data manipulation phases.

FIG. 15 illustrates exemplary media data characterizations 1500, including a look-ahead region 1502, that indicate differing media data manipulation phases. A media data asset 1004 includes multiple media data blocks 1006(1), 1006(2) . . . 1006(7), 1006(8) . . . . Each media data block 1006 is associated with a sender 304 and stored at a device 302 thereof via a hash striping media data distribution approach (e.g., as described herein above with particular reference to FIGS. 11-13).

Although media data characterizations 1500 are illustrated as starting at media data block 1006(1), they may be generalized to start at any given media data block 1006. Media data asset 1004 is divided into a current block 1506, an alternative send request region 1504, and a look-ahead region 1502.

Current block 1506 corresponds to media data block 1006(1). An expanded view of media data block 1006(1) includes multiple media data sub-blocks 1008(1), 1008(2), 1008(3) . . . 1008(s). As current block 1506, media data block 1006(1) is the media data block 1006 that is being processed by a remote client 206 (not shown in FIG. 15). It should be noted that, because of early send requests from alternative send request region 1504, the media data block 1006 that is being processed by client 206 may already be completely local to client 206 when it is time for client 206 to process the first media data sub-block 1008(1).

On the other hand, if some media data sub-blocks 1008 are still being transmitted to client 206 when client 206 is processing media data block 1006(1), one or more media data sub-blocks 1008 may be deadline data 1514. Send requests 604 (of FIG. 6 et seq.) for such deadline data 1514 are assigned the highest send priority to avoid a streaming failure.

If there is currently no deadline data 1514, and at least one send request 604 for at least one non-deadline media data sub-block 1008 does not have a sufficiently high priority to exceed a threshold priority 704 of the associated sender 304, a scheduler 306 may proceed to consider alternative send request region 1504 during a send negotiation per timeslot 900 (of FIG. 9). (As described above with particular reference to options evaluation 906 of FIG. 9, scheduler 306 may also consider increasing an assigned send priority.) In order of consideration for alternative send request region 1504: (1) early data 1508, (2) later early data 1510, and (3) even later early data 1512 are considered for a potential send request 604. Later early data 1510, for example, is considered after early data 1508 because later early data 1510 is further into the future from a deadline time.

If a respective sender 304 that is associated with a respective media data block 1006(2), 1006(3), or 1006(4) has a threshold priority 704 that is lower than what a send request 604, which stipulates an associated respective media data block 1006, from the scheduler 306 would have, then scheduler 306 formulates and transmits a send request 604 to the respective sender 304 as part of a subsequent send request 908 in an attempt to facilitate providing sender 304 with sufficient send requests 604 (each having an associated priority) such that sender 304 may fully and appropriately utilize its outgoing bandwidth 602 in this timeslot by sending all the highest priority data that will fit within its outgoing bandwidth 602 to clients 206 in this timeslot.

Of media data blocks 1006(2, 3, and 4) of alternative send request region 1504, the respective media data block 1006 that has the earliest data 1508/1510/1512 and a sufficiently high respective send priority is selected as the target for a send request 604. One or more media data sub-blocks 1008, including the next unsent media data sub-block 1008, of the selected media data block 1006 of alternative send request region 1504 is stipulated by the send request 604 for sending to client 206. In this manner, a scheduler 306 is able to contribute to the saturation of links 314 (of FIGS. 3-6) from senders 304 while keeping a reception buffer at client 206 as full as possible (e.g., storing approximately two media data blocks 1006 or about 10 seconds of media).

Look-ahead region 1502 can be instrumental in reducing latency. Implementing a look-ahead region 1502 with reserving and/or pre-loading can also enable a mass storage of media data 310 (of FIG. 3) to be somewhat if not significantly less robust and powerful than RAM.

Schedulers 306 maintain a reservation/pre-loading zone at look-ahead region 1502 by attempting to ensure that a media data block 1006 that will be needed in the future will be present at the associated sender 304, as determined by a hash striping media data distribution approach, for example. Schedulers 306 cause senders 304 to reserve, and if necessary pre-load, media data blocks 1006 in look-ahead region 1502 using a look-ahead procedure (e.g., a look-ahead request, a look ahead operation, etc.). These look-ahead reserving and/or pre-loading aspects are described further below with reference to FIG. 16.

It should be noted that the illustrated collection of data and block types, message regions, etc. is only an exemplary described implementation and that other configurations may alternatively be implemented. Moreover, the illustrated collection effectively represents a snapshot in time for the exemplary configuration that actually changes dynamically. For example, the locations of early media data 1508, later early media data 1510, and even later early media data 1512 move along media data asset 1004 as current block 1506 moves along media data asset 1004 due to completing a sending of current block 1506 to a client 206. Also, alternative send request region 1504 may overlap look-ahead region 1502. Additionally, either or both regions may extend from e.g. 2 to 16 media data blocks 1006 from current block 1506; however, 2 to 8 media data blocks 1006 is likely a sufficient range.

Figure 16:
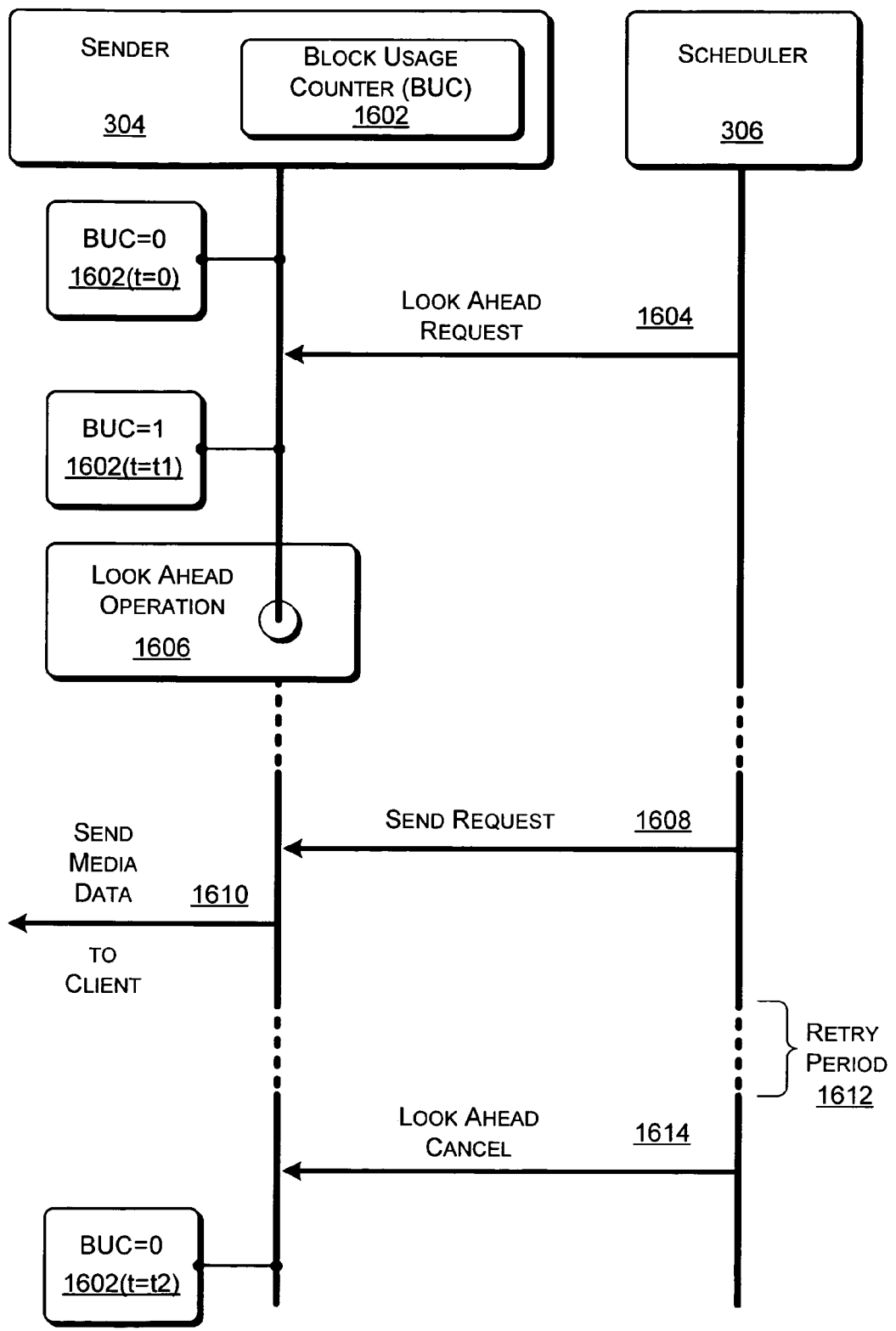
FIG. 16 is an exemplary sequence diagram that involves a look-ahead procedure between a scheduler and a sender.

FIG. 16 is an exemplary sequence diagram 1600 that involves a look-ahead procedure between a scheduler 306 and a sender 304. Sender 304 includes a block usage counter (BUC) 1602 that effectively serves as a retention lock on a corresponding media data block 1006 (not shown in FIG. 16). As noted above, a given sender 304, because of memory constraints of its device 302, may not (and likely cannot) keep all of the media data blocks 1006 that hash 1108 to the given sender 304 in the RAM of its device 302. Hence, at least some of these media data blocks 1006 are rotated between a memory 404 of device 302 and mass storage of media data 310. As noted above, media data blocks 1006 that are (i) less or least popular and (ii) not locked may be purged.

Media data blocks 1006 are locked when one or more schedulers 306 have reserved them. This reservation may be accomplished using a look ahead request 1604 (e.g., a type of protocol message 504). In short, look ahead requests 1604 increment block usage counter 1602, and a media data block 1006 cannot be purged while its corresponding block usage counter 1602 is non-zero. There is therefore a corresponding block usage counter 1602 for each media data block 1006. However, block usage counters may alternatively be applied on a media data granularity level other than media data blocks 1006.

An example of a look ahead procedure is described as follows: A block usage counter 1602 equals zero (0) prior to any scheduler 306 requesting a look ahead on its corresponding media data block 1006. Hence, block usage counter 1602 (t=0) is shown as equaling zero at time=0. When a scheduler 306 is ready to look ahead at a particular media data block 1006 (e.g., media data block 1006(7) of look-ahead region 1502), the scheduler 306 formulates and transmits a look ahead request 1604 that identifies the media data block 1006 of interest to a sender 304 that is responsible for storing and sending that media data block 1006.

In response to receiving the look ahead request 1604, sender 304 increments block usage counter 1602. Hence, block usage counter 1602(t=t1) is shown as equaling one at time=t1. Furthermore, sender 304 performs a look ahead operation 1606. Sender 304 checks/determines whether the identified media data block 1006 is already in a RAM portion of memory 404. If so, sender 304 has completed look ahead operation 1606 (once block usage counter 1602 has been incremented before, after, or during performance of look ahead operation 1606).

If, on the other hand, the identified media data block 1006 is not already in RAM portion of memory 404, sender 304 causes the identified media data block 1006 to be loaded into RAM from mass storage of media data 310 in addition to incrementing block usage counter 1602. After ensuring that media data block 1006 is present in RAM (e.g., by verifying its presence and/or by loading it), sender 304 may optionally inform scheduler 306 of the successful locking. Alternatively, schedulers 306 may be configured to send look ahead requests 1604 sufficiently in advance so as to render this confirmation relatively irrelevant.

After some period of time, scheduler 306 transmits a send request 1608 (e.g., such as a send request 604) to sender 304 that stipulates the earlier-identified media data block 1006 by way of one or more media data sub-blocks 1008. Because the media data block 1006 is present and locked by virtue of block usage counter 1602, sender 304 can send the requested one or more media data sub-blocks 1008 thereof to a designated client 206 (as indicated at 1610) without a delay attributable to media data loading.

After a retry period 1612 (e.g., after scheduler 306 is fairly sure of sending success), scheduler 306 sends a look ahead cancel 1614 (e.g., another type of protocol message 504) to sender 304. Look ahead cancel 1614 identifies the media data block 1006 that is no longer in need of reservation by scheduler 306. In response to look ahead cancel 1614, sender 304 decrements block usage counter 1602. In this example, no other schedulers have placed a lock on the identified media data block 1006. Hence, block usage counter 1602(t=t2) is shown as equaling zero (0) again at time=t2, where t2 is later than t1. When block usage counter 1602 is zero, the corresponding media data block 1006 is available to be considered for purging (e.g., swapping with a different media data block 1006) in accordance with a given replacement policy (e.g., based on popularity).

Schedulers 306 have several options when/if choosing to lock a media data block 1006 on multiple senders 304 even though schedulers 306 actually request media data sub-block 1008 sends from one sender 304 at a time; otherwise schedulers 306 do not actually have multiple senders 304 as multiple sending options when the time arrives to request the sending of the media data sub-blocks 1008. Also, a scheduler 306 may choose arbitrarily between senders 304 with which the scheduler 306 has locked a media data block 1006 when doing original media-data-sub-block-1008-level send requests 902 within that locked media data block 1006.

Although subsequent send requests 908 may get restricted to specific senders 304 due to initial and intermediate threshold priority 904 and 910 constraints, original send requests 902 at the beginning of each timeslot have senders 304 that are chosen arbitrarily among those where the media data block 1006 is known to be locked by the requesting scheduler 306. In low-load situations where media data is not being moved around much, a scheduler 306 may elect to forgo locking all of the possible media data block 1006 options, and in any case, the scheduler 306 may limit itself to locking down only two (or another number) of media data blocks 1006, even if there are more options available. This election to not utilize all locking possibilities may be implemented, for example, to avoid locking down too much media data overall and to reduce protocol overhead.

It should be noted that some description herein (e.g., description that is directed to popularity-dependent media data replication, to media data hash distribution (e.g., striping), to media data organization, etc.) is also beneficially applicable to and/or advantageously implementable in conjunction with a central-collector type dissemination of media data.

Media data dissemination architecture 202, including individual devices 302 thereof, may include a variety of processor-accessible media and/or may be in communication with such processor-accessible media. The processor-accessible media may be any media that is accessible by a computing or other (e.g., electronic) device. Hence, such processor-accessible media may include both volatile and non-volatile media, both removable and non-removable media, both storage (e.g., memory 404 and 310) and transmission (e.g., links 208, 210, 314, etc.) media, some combination thereof, and so forth. Any of the media may comprise processor-executable instructions.

In fact, implementations for distributed sending of media data may be described in the general context of processor-executable instructions. Generally, processor-executable instructions include routines, programs, protocols, objects, interfaces, components, data structures, etc. (e.g., in the form of applications/modules) that perform and/or enable particular tasks and/or implement particular abstract data types. Distributed sending of media data, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

The devices, actions, aspects, features, procedures, components, etc. of FIGS. 2-16 are illustrated in diagrams that are divided into multiple blocks. However, the order, interconnections, interrelationships, layout, etc. in which FIGS. 2-16 are described and/or shown is not intended to be construed as a limitation, and any number of the blocks can be modified, combined, rearranged, augmented, omitted, etc. in any manner to implement one or more systems, methods, devices, procedures, media, apparatuses, servers, arrangements, etc. for distributed sending of media data. Furthermore, although the description herein includes references to specific implementations, the illustrated and/or described implementations can be implemented in any suitable hardware, software, firmware, or combination thereof and using any suitable computing architecture(s), network element(s) and/or organization(s), video encoding standard(s), multicast and unicast scheme(s), and so forth.

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. One or more processor-accessible storage media comprising processor-executable instructions that, when executed, direct at least one device to perform actions comprising:
   transmitting a send request having a priority;
   receiving a threshold priority,
      wherein the threshold priority is calculated from a variety of factors including whether media data requested in the send request comprises deadline media data versus relatively sooner early media data or relatively later early media data;
   comparing the priority of the send request to the threshold priority;
   determining if the send request is selected for sending responsive to the comparing, wherein if the priority of the send request is more important than the threshold priority, the send request is selected for sending, and if the priority of the send request is not more important than the threshold priority, the send request is not selected for sending; and
   scheduling the sending, if the send request is selected,
      wherein scheduling includes stipulating a particular media portion to be sent to a designated destination client, and
   wherein the action of transmitting a send request comprises an action of transmitting the send request which is associated with a unique priority; wherein the send request stipulates media data, and the unique priority is dependent at least in part on whether the stipulated media data is associated with fewer capable senders versus many capable senders, with association with fewer capable senders having a relatively higher priority.

2. The one or more processor-accessible media as recited in claim 1, wherein the action of transmitting a send request comprises an action of:
   transmitting the send request to a sender having media data stipulated in the send request to be sent to a destination client designated in the send request.

3. The one or more processor-accessible media as recited in claim 2, wherein the action of receiving a threshold priority comprises an action of:
   receiving the threshold priority from the sender having media data stipulated in the send request to be sent to a destination client designated in the send request, the threshold priority representing a send request cutoff that indicates a least important priority for send requests selected for sending by the sender.

4. The one or more processor-accessible media as recited in claim 1, wherein the action of transmitting a send request comprises an action of:
   transmitting the send request which is associated with a unique priority; wherein the send request stipulates media data, and the unique priority is dependent at least in part on whether the stipulated media data comprises deadline media data versus early media data, with deadline media data having a relatively higher priority.

5. The one or more processor-accessible media as recited in claim 1, wherein the action of transmitting a send request comprises an action of transmitting the send request to a sender having media data stipulated in the send request to be sent to a destination client designated in the send request; and wherein the processor-executable instructions, when executed, direct the at least one device to perform further actions comprising:
  if the send request is not determined to be selected for sending responsive to the comparing,
  determining if the priority of the send request is more important than at least one other threshold priority received from at least one other sender that is capable of implementing the send request; and
  if so, transmitting the send request to the at least one other sender that is capable of implementing the send request.

6. The one or more processor-accessible media as recited in claim 1, wherein at least a portion of the processor-executable instructions comprise at least part of software implementing a scheduler to schedule sending of media data portions of a media data stream to clients.

7. One or more processor-accessible storage media comprising processor-executable instructions that, when executed, direct at least one device to perform actions comprising:
  receiving a plurality of send requests, each respective send request of the plurality of send requests having a respective priority;
  ascertaining a threshold priority based on the respective priorities of the respective send requests and responsive to a send bandwidth,
    wherein the action of ascertaining a threshold priority comprises actions of: accumulating bandwidth consumption of the plurality of send requests from a send request that is most important to those that are less important in accordance with the respective priorities thereof, and determining a last send request at which the accumulated bandwidth consumption is less than or equal to the send bandwidth, and setting the threshold priority to a priority corresponding to the last send request at which the accumulated bandwidth consumption is less than or equal to the send bandwidth, and
    wherein the threshold priority is calculated from a variety of factors including whether media data requested in the send request comprises deadline media data versus relatively sooner early media data or relatively later early media data; and
  broadcasting the threshold priority.

8. The one or more processor-accessible media as recited in claim 7, wherein the action of receiving a plurality of send requests comprises an action of:
  receiving the plurality of send requests from a plurality of schedulers that formulated each send request of the plurality of send requests to include a stipulated media data portion, to designate a destination client, and to have a unique priority.

9. The one or more processor-accessible media as recited in claim 7, comprising the processor-executable instructions that, when executed, direct the at least one device to perform a further action comprising:
  ranking the plurality of send requests according to respective priorities of respective send requests of the plurality of send requests.

10. The one or more processor-accessible media as recited in claim 9, wherein the action of ascertaining a threshold priority comprises an action of:
  detecting a particular send request of the plurality of send requests that corresponds to a send request cutoff using the ranked plurality of send requests and the send bandwidth.

11. The one or more processor-accessible media as recited in claim 7, comprising the processor-executable instructions that, when executed, direct the at least one device to perform further actions comprising:
  discarding send requests of the plurality of send requests that do not fit within the send bandwidth; and
  partially discarding and partially retaining a send request of the plurality of send requests that is only partially within the send bandwidth.

12. The one or more processor-accessible media as recited in claim 7, wherein the action of broadcasting the threshold priority comprises at least one action of:
  unicasting the threshold priority to a plurality of schedulers; or
  multicasting the threshold priority to the plurality of schedulers.

13. The one or more processor-accessible media as recited in claim 7, wherein at least a portion of the processor-executable instructions comprise at least part of software implementing a sender that is adapted to send to clients media data portions with which the sender is associated responsive to the plurality of send requests.

14. An arrangement for prioritized distributed sending of media data, the arrangement comprising:
  scheduler means for requesting sending of media data via send requests having send priorities; the scheduler means including determination means for determining if the send requests have been selected for sending using the send priorities and a threshold priority, wherein if the priority of a send request is more important than the threshold priority, the send request is selected for sending, and if the priority of the send request is not more important than the threshold priority, the send request is not selected for sending, and checking means for checking whether another threshold priority is lower than the send priorities of send requests that are not selected for sending; and
  sender means for sending media data portions in response to the send requests in accordance with the send priorities; the sender means including ascertainment means for ascertaining the threshold priority based on the send priorities of the send requests and responsive to a send bandwidth of the sender means,
    wherein the threshold priority is calculated from a variety of factors including whether media data requested in the send request comprises deadline media data versus relatively sooner early media data or relatively later early media data.

15. The arrangement as recited in claim 14, wherein the scheduler means further comprises:
  formulation means for originally formulating the send requests to include designated destination clients, stipulated media data portions, and the send priorities.

16. The arrangement as recited in claim 14, wherein the scheduler means further comprises:
  transmission means for transmitting each send request of the send requests to a sender means of a plurality of sender means, each sender means of the plurality of sender means having at least one send request being transmitted thereto in dependence on which media data portions are associated therewith.

17. The arrangement as recited in claim 14, wherein the determination means further comprises:
  comparison means for comparing the send priorities to the threshold priority.

18. The arrangement as recited in claim 14, further comprising:
 a plurality of scheduler means and a plurality of sender means that are exchanging send requests and threshold priorities.

19. The arrangement as recited in claim 14, wherein the sender means further comprises:
 ranking means for ranking the send requests from most important to least important according to the send priorities.

20. The arrangement as recited in claim 14, wherein the arrangement comprises at least one of (i) one or more processor-accessible media or (ii) at least one device.

21. A system that is configured to perform actions comprising:
 transmitting a send request associated with a send priority from a scheduler to a sender;
 ascertaining a threshold priority at the sender based on a ranking of send requests and responsive to a send bandwidth of the sender, the ranking of send requests including the send request from the scheduler,
  wherein the threshold priority is calculated from a variety of factors including whether media data requested in the send request comprises deadline media data versus relatively sooner early media data or relatively later early media data;
 transmitting the threshold priority to the scheduler;
 determining at the scheduler if the send request is being honored by the sender using the threshold priority and the send priority associated with the send request; wherein if the priority of the send request is more important than the threshold priority, the send request is determined to be honored and selected for sending, and if the priority of the send request is not more important than the threshold priority, the send request is not determined to be honored and not selected for sending;
and if the send request is not determined to be honored by the sender, then:
 checking, at the scheduler, if another sender having media data as stipulated in the send request has transmitted another threshold priority that is less important than the send priority associated with the send request, and if so:
 transmitting a subsequent send request associated with the send priority from the scheduler to the other sender.

22. The system as recited in claim 21, wherein the system is configured to perform further actions comprising:
 ranking the send requests in order of respective priorities of respective send requests of the send requests to produce the ranking of send requests; and
 detecting a send request cutoff corresponding to a send request (i) that fits within the send bandwidth of the sender and (ii) that is associated with a lowest send priority of all send requests that fit within the send bandwidth of the sender.

23. The system as recited in claim 21, wherein the system comprises a plurality of devices; and wherein (i) the scheduler and the sender are functioning on a single device of the plurality of devices or (ii) the scheduler is functioning on a first device of the plurality of devices, and the sender is functioning on a second device of the plurality of devices.

24. The system as recited in claim 21, wherein the system is configured to perform further actions comprising:
 receiving the send request at the sender from the scheduler; and
 transmitting, in response to the receiving, an acknowledgment from the sender to the scheduler if the send priority associated with the send request is more important than a current threshold priority of the sender.

25. The system as recited in claim 21, wherein the action of determining comprises:
 determining that the send request is being honored by the sender if (i) the send priority associated with the send request is as important or more important than the threshold priority of the sender, (ii) an acknowledgment is received at the scheduler from the sender in response to the transmitting of the send request, and (iii) the threshold priority is marked by the sender as being final.

26. The system as recited in claim 21, wherein the system is configured to perform further actions comprising:
 if the send request is not determined to be honored by the sender, then:
  checking, at the scheduler, if another sender has transmitted another threshold priority that is less important than another send priority that is assignable to the send request by the scheduler; and
 if so, transmitting from the scheduler to the other sender a subsequent send request associated with the other send priority as assigned by the scheduler.

27. One or more processor-accessible storage media comprising processor-executable instructions that, when executed, cause a system to create schedulers that formulate send requests having send priorities in order to provide media data streams to clients; to establish senders that are respectively associated with respective media data portions and ascertain respective threshold priorities calculated in part based on whether media data requested in the send requests comprises deadline media data versus relatively sooner early media data or relatively later early media data, each time slot based on respective prioritized rankings of the respective send requests received at each sender from the schedulers and responsive to respective send bandwidths of each respective sender; and to enable the schedulers to determine if send requests are being honored by respective senders using the respective ascertained threshold priorities thereof, wherein if the priority of a send request is more important than the threshold priority, the send request is determined to be honored and selected for sending, and if the priority of the send request is not more important than the threshold priority, the send request is not determined to be honored and not selected for sending,
 wherein the schedulers transmit subsequent send requests to the senders in response to the ascertained threshold priorities, and wherein the subsequent send requests are at least one of (i) transmitted to different senders as compared to original send requests and/or (ii) assigned a more important send priority as compared to the original send requests.

28. The one or more processor-accessible media as recited in claim 27, comprising the processor-executable instructions wherein each respective send bandwidth comprises a percentage, which is less than 100 percent, of a respective maximum outgoing bandwidth that is available at each respective sender of the established senders.

29. The one or more processor-accessible media as recited in claim 27, comprising the processor-executable instructions wherein respective senders of the senders are further adapted to ascertain respective intermediate threshold priorities within each time slot based on respective prioritized rankings of the subsequent send requests received at each sender from the schedulers and responsive to the respective send bandwidth of each respective sender.

30. The one or more processor-accessible media as recited in claim 27, comprising the processor-executable instructions wherein each respective scheduler uses no more than a particular percentage, with the particular percentage being less than 100 percent, of a respective allotted portion of an aggregate send bandwidth of the senders that has been allotted to each respective scheduler when allocating media data sends to ensure future guaranteed media data delivery deadlines.

* * * * *